United States Patent
Nelson et al.

(10) Patent No.: US 10,901,719 B2
(45) Date of Patent: Jan. 26, 2021

(54) APPROACH FOR DESIGNING SKILLS FOR COGNITIVE AGENTS ACROSS MULTIPLE VENDOR PLATFORMS

(71) Applicants: Steven A. Nelson, San Jose, CA (US); Hiroshi Kitada, Tuckahoe, NY (US); Lana Wong, Belleville, NJ (US)

(72) Inventors: Steven A. Nelson, San Jose, CA (US); Hiroshi Kitada, Tuckahoe, NY (US); Lana Wong, Belleville, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/980,619

(22) Filed: May 15, 2018

(65) Prior Publication Data
US 2019/0354358 A1    Nov. 21, 2019

(51) Int. Cl.
*G06F 8/65* (2018.01)
*G06N 5/02* (2006.01)

(52) U.S. Cl.
CPC .............. *G06F 8/65* (2013.01); *G06N 5/022* (2013.01)

(58) Field of Classification Search
CPC .............. G06F 3/167; G06F 3/04817; G06F 16/90332; G06F 17/28; G06F 3/048; G06F 8/34; G06F 8/38; G06F 8/65; G06N 5/022
See application file for complete search history.

(56) References Cited

U.S. PATENT DOCUMENTS

| | | |
|---|---|---|
| 10,217,453 B2 | 2/2019 | Stevans |
| 2012/0041903 A1 | 2/2012 | Beilby |
| 2014/0244712 A1 | 8/2014 | Walters |
| 2015/0169336 A1 | 6/2015 | Harper |
| 2015/0172463 A1 | 6/2015 | Quast |
| 2015/0185996 A1 | 7/2015 | Brown |
| 2016/0070581 A1* | 3/2016 | Soon-Shiong .......... G06F 9/453 715/706 |
| 2017/0048170 A1 | 2/2017 | Smullen |

(Continued)

OTHER PUBLICATIONS

Nelson, U.S. Appl. No. 15/981,062, filed May 16, 2018, Office Action, dated Mar. 26, 2020.

(Continued)

*Primary Examiner* — S. Sough
*Assistant Examiner* — Cheneca Smith
(74) *Attorney, Agent, or Firm* — Hickman Palermo Becker Bingham LLP; Edward A. Becker

(57) ABSTRACT

A cognitive agent system provides a centralized capability for users to configure and deploy cognitive agents across multiple heterogeneous vendor platforms. The cognitive agent system provides a design environment that allows users to define skills, as well as a new conversation construct that supports more complex interactions with users. The cognitive agent system also includes a deployment environment that allows users to register users and cognitive agents, deploy skills and conversations, and monitor the activity of cognitive agents across multiple vendor platforms. These users may use the cognitive agent system to define skills and conversations once and then deploy the skills and conversations to multiple service endpoints across different vendor platforms. In addition, the cognitive agent system allows user to directly manage cognitive agents that are not specific to any particular vendor.

20 Claims, 18 Drawing Sheets

(56) References Cited

U.S. PATENT DOCUMENTS

| | | |
|---|---|---|
| 2017/0357638 A1 | 12/2017 | Schlesinger |
| 2018/0302345 A1 | 10/2018 | Landowski |
| 2018/0332169 A1 | 11/2018 | Somech |
| 2019/0205461 A1* | 7/2019 | Rodgers ................. H04L 67/38 |
| 2019/0355363 A1 | 11/2019 | Nelson |

OTHER PUBLICATIONS

Nelson, U.S. Appl. No. 15/981,062, filed May 16, 2018, Final Office Action dated Sep. 30, 2020.

* cited by examiner

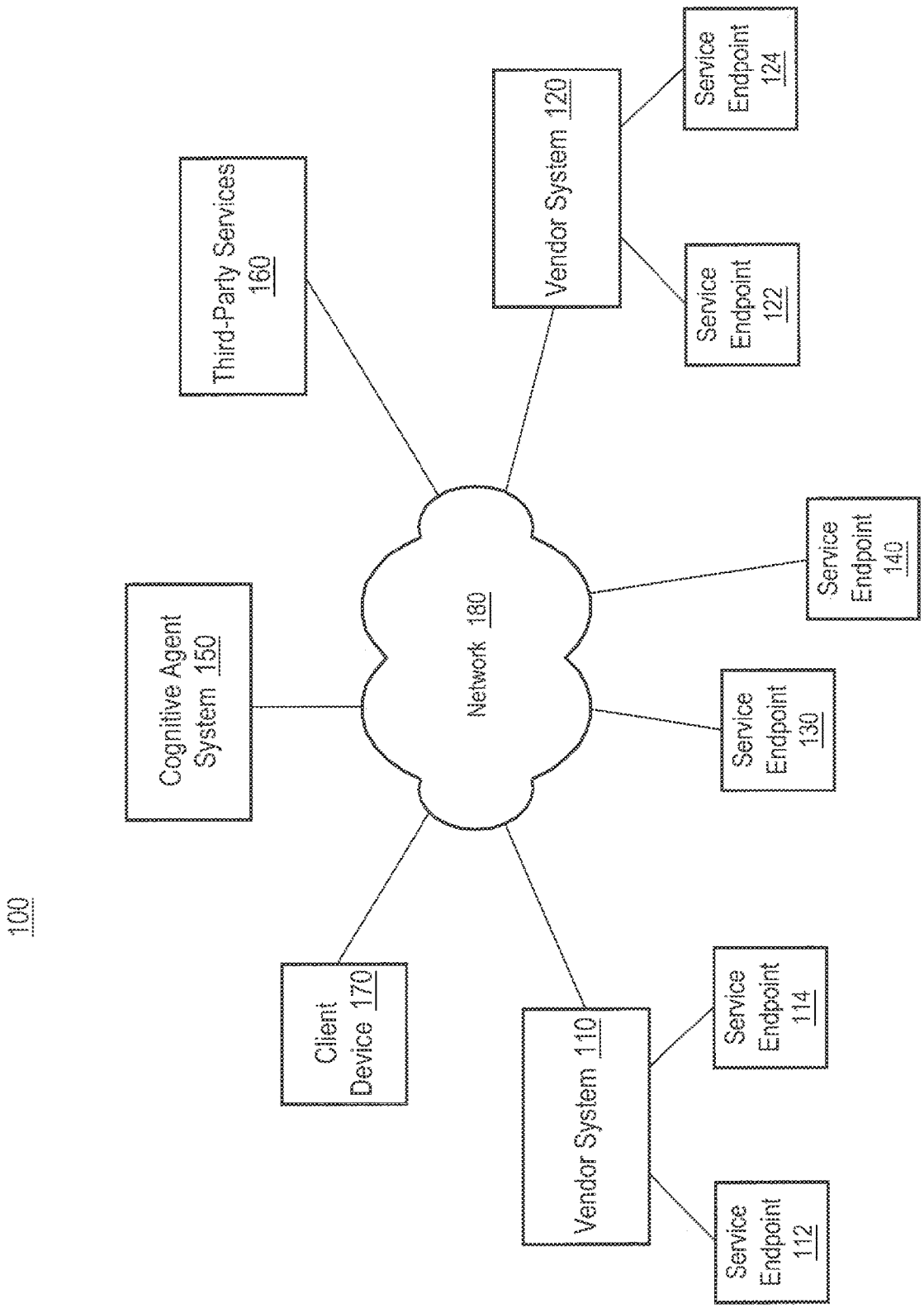

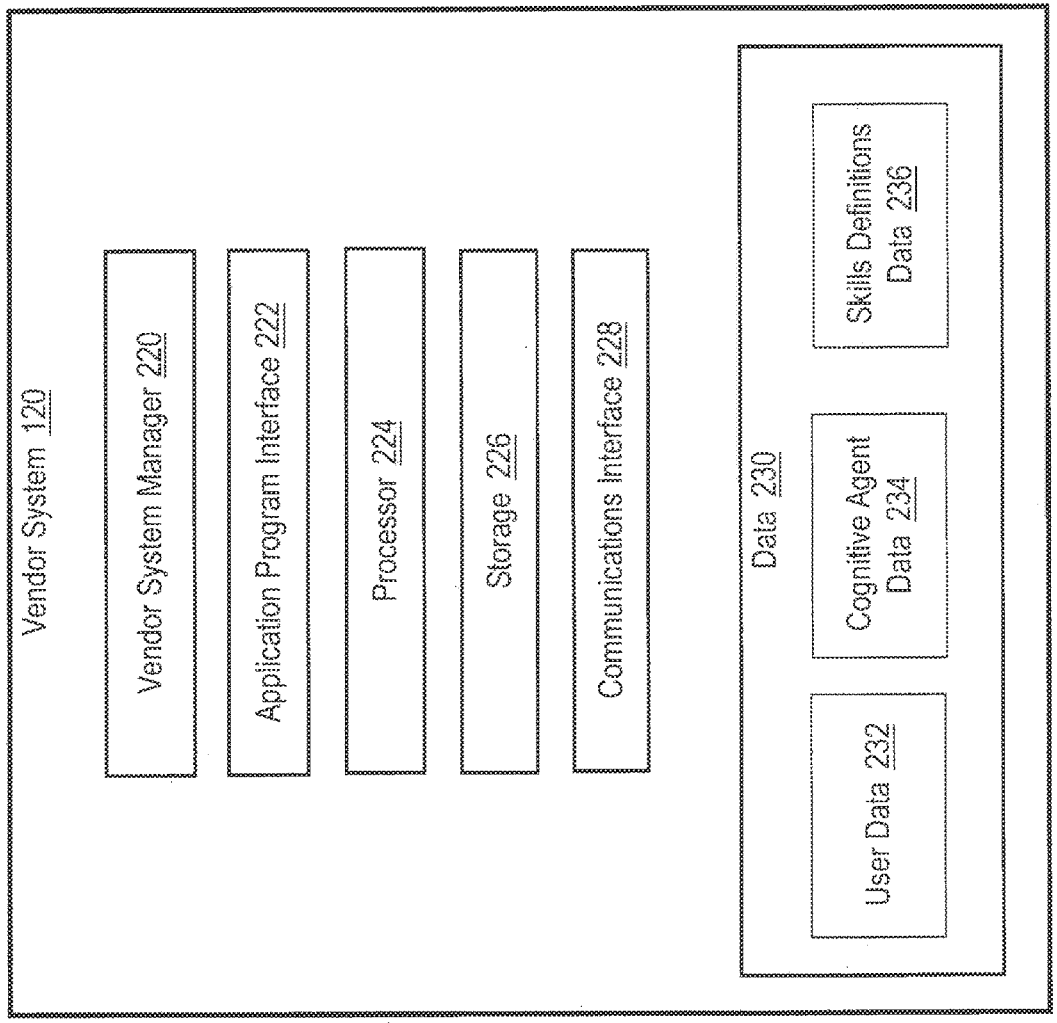
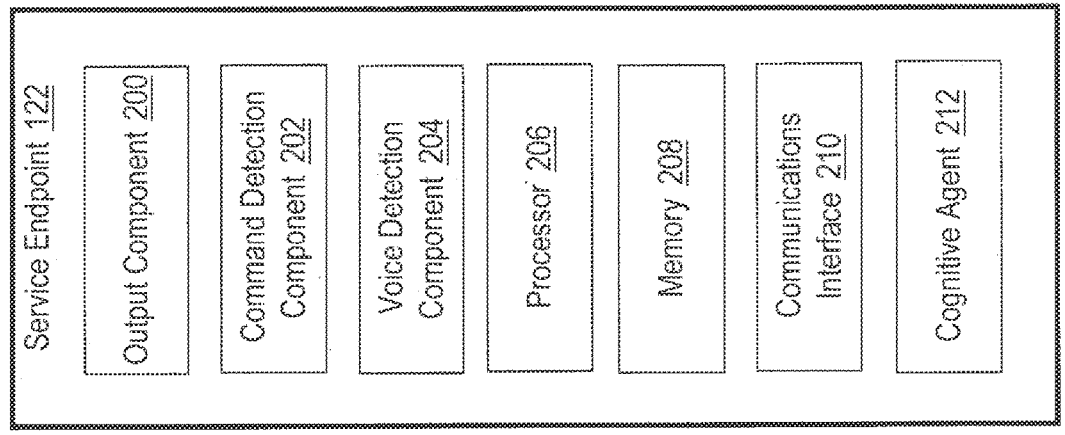

FIG. 4D

Skills Definitions Data 466

Skill Name
Skill ID
Skill Type/Category
Command
Function(s)
Status

FIG. 4C

Cognitive Agent Data 464

Cognitive Agent ID
Type and Version
Vendor ID
Service Endpoint ID
Associated Device IDs
User ID
Skills
Conversations
Status

FIG. 4E

Conversations Definitions Data 468

Skill Name
Skill ID
Skill Type/Category
Command
Function(s)
Data Type(s)
Status

FIG. 4B

User Data 462

User Name
Login Credentials
Contact Information
Organization
Cognitive Agent ID
Service Endpoint ID
Associated Device IDs
Skills
Conversations
Authentication Data
Status

FIG. 4F

Skills Definitions Data 466

| Skill Name | Skill ID | Skill Type | Command | Function(s) |
|---|---|---|---|---|
| Lights On | HC093 | Home Control | Lights On / Turn Lights On | Turn lights on |
| Lights Off | HC094 | Home Control | Lights Off | Turn lights off |
| Lock Front Door | HC095 | Home Control | Lock Front Door | Lock front door |
| Play Music | HC101 | Home Control | Play Music | Play music from favoritesplaylist |
| Order Car Service | ES101 | Third-Party Service | Car Service | Request car service |
| Order Pizza | ES105 | Third-Party Service | Order Pizza | Order pizza |
| Play Movie | ES111 | Third-Party Service | Play Movie | Play a movie |
| Information Query | ES117 | Third-Party Service | Query | Answer questions |
| Secure Home | ES127 | Home Control | Secure Home | Lock all doors, turn on security lights |

FIG. 4G

Conversations Definitions Data 468

| Conversation Name | Conversation ID | Conversation Type | Command | Function |
|---|---|---|---|---|
| Lights On | HC093 | Home Control | Turn lights on | |
| Lights Off | HC094 | Home Control | Turn lights off | |
| Lock Front Door | HC095 | Home Control | Lock front door | |
| Play Music | HC101 | Home Control | Play music from favoritesplaylist | |
| Car Service | ES101 | Third-Party Service | Request car service | |
| Order Pizza | ES105 | Third-Party Service | Order pizza | |
| Play Movie | ES111 | Third-Party Service | Play a movie | |
| Play Movie | ES111 | Third-Party Service | Play a movie | |

FIG. 5B

User Management

Home  501
Users  512

User 1
User 2
User 3
User 4
User 5
User 6
User 7

New  Edit  Delete
514

510

516

User Name: User 3
Login Credentials: User 3; Password3
Contact Information: User 3@email.com
Organization: XYZ Corp.
Cognitive Agent ID: CI-319
Service Endpoint ID: SE4832
Associated Device IDs: MFP4529
Skills: Lights On; Lights Off; Lock Front Door; Play Music; Order Car Service; Order Pizza; Play Movie; Information Query; Secure Home
Conversations:
Status: Authenticated - registered on Vendor System 120

518
Save  Cancel

FIG. 5C

| | 520 |
|---|---|
| Home  501 | |
| Cognitive Agents | |

Cognitive Agents

522

Cognitive Agent 1
Cognitive Agent 2
Cognitive Agent 3
Cognitive Agent 4
Cognitive Agent 5
Cognitive Agent 6
Cognitive Agent 7

New  Edit  Delete
524

| | | 526 |
|---|---|---|
| Cognitive Agent ID | Cognitive Agent 3 | |
| Type and Version | Type CA9; Version 5.2 | |
| Vendor ID | Vendor System 120 | |
| Service Endpoint ID | SE4832 | |
| Associated Device IDs | MFP4529 | |
| User ID | User 3 | |
| Skills | Lights On; Lights Off; Play Music; Order Pizza; Play Movie, Information Query | |
| Conversations | | |
| Status | Configured - normal | |

528
Save  Cancel

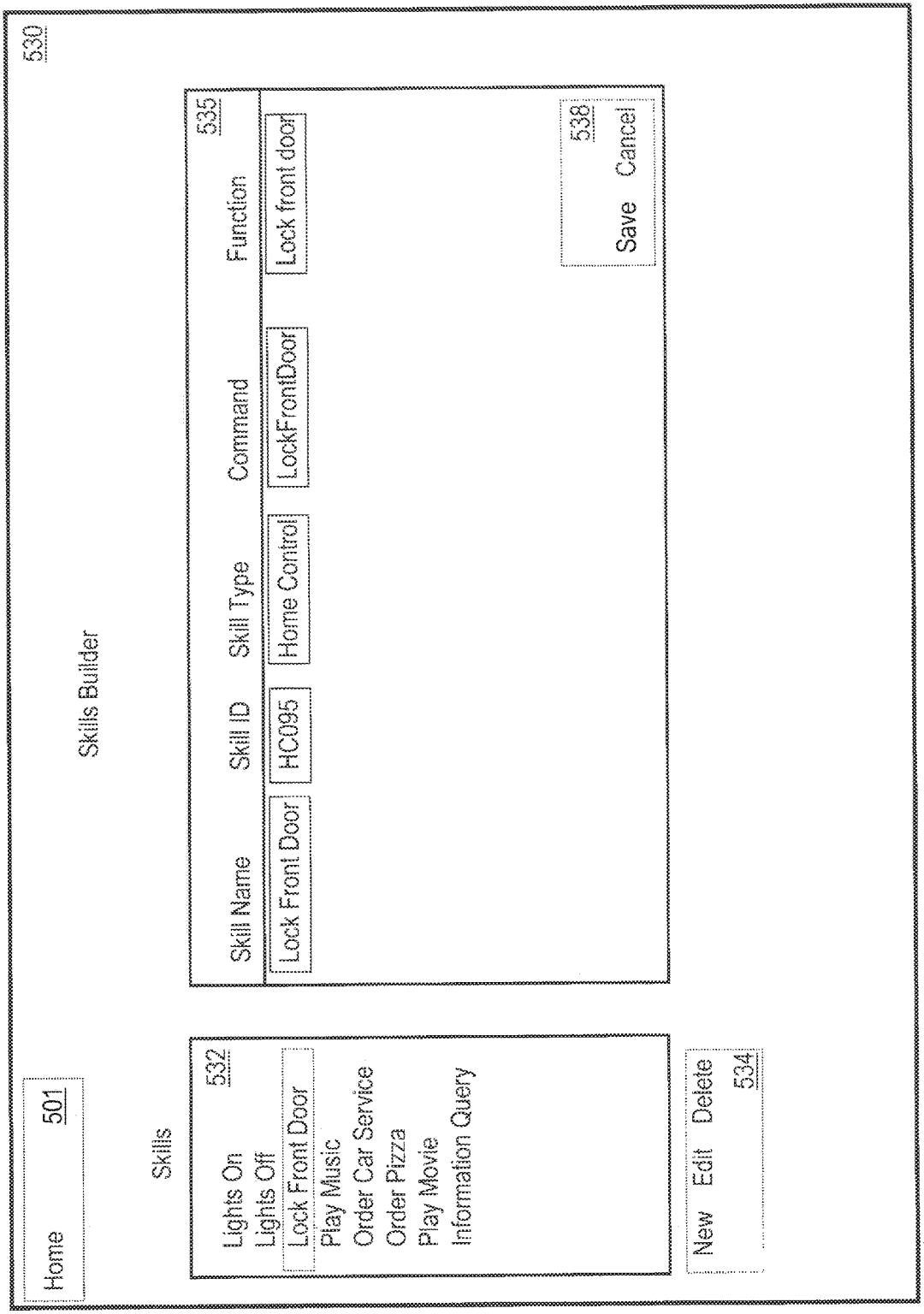

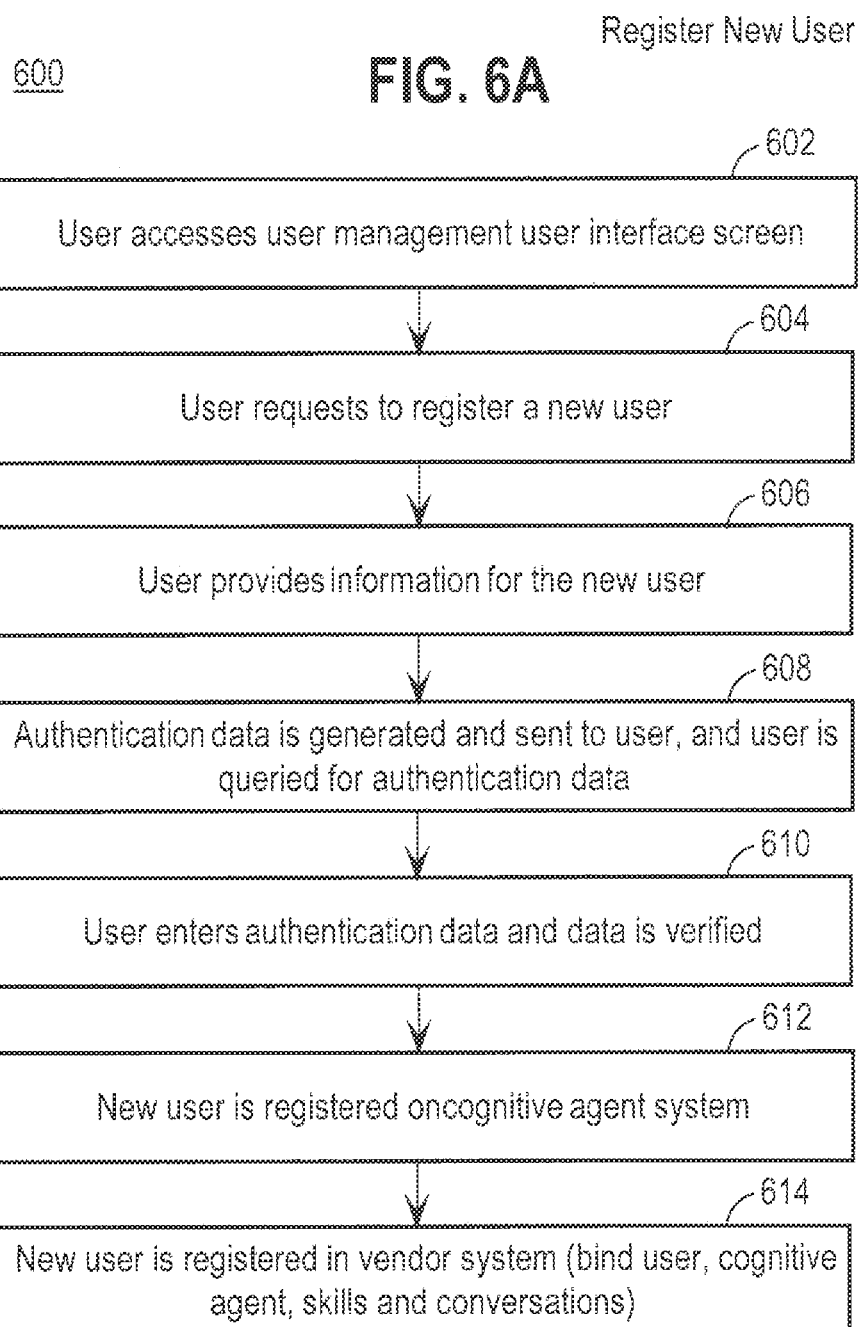

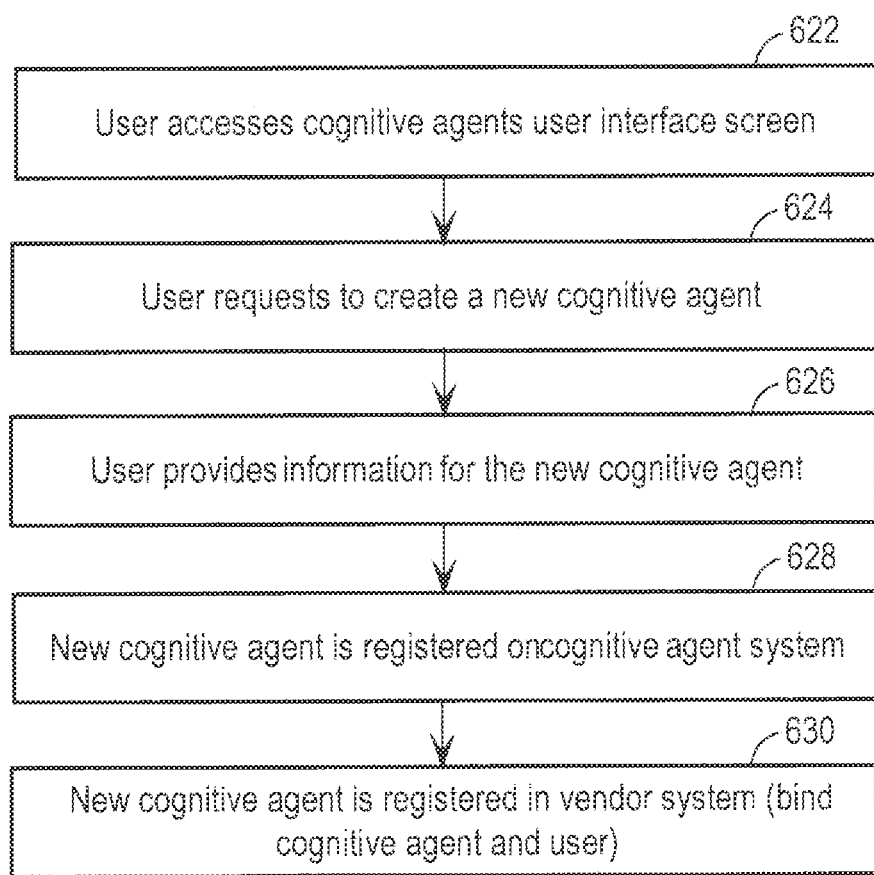

Define New Skill
640  FIG. 6C
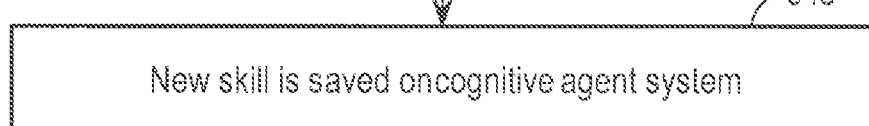
642 — User accesses skills builder user interface screen
644 — User requests to create a new skill
646 — User provides information for the new skill
648 — New skill is saved on cognitive agent system

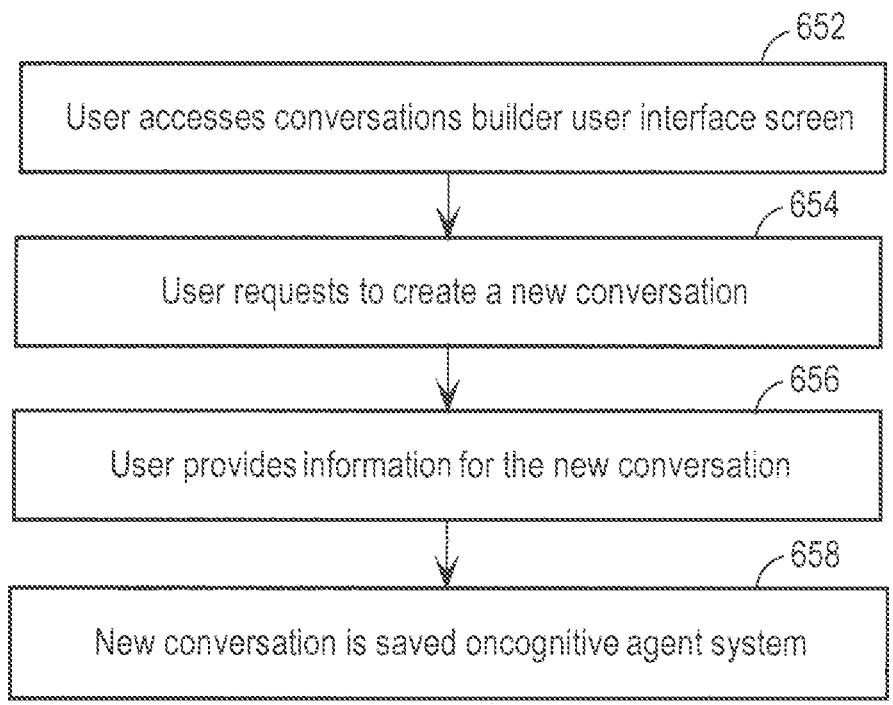

APPROACH FOR DESIGNING SKILLS FOR COGNITIVE AGENTS ACROSS MULTIPLE VENDOR PLATFORMS

RELATED APPLICATION DATA AND CLAIM OF PRIORITY

This application is related to U.S. patent application Ser. No. 15/981,062 entitled "Approach for Deploying Skills for Cognitive Agents Across Multiple Vendor Platforms", filed May 16, 2018, the contents all of which are incorporated by reference in its entirety for all purposes as if fully set forth herein.

FIELD

Embodiments relate generally to designing skills for cognitive agents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted prior art by inclusion in this section.

There has been continued growth in the area of virtual assistants, also known as "cognitive agents." A cognitive agent is a computer-implemented process that performs tasks or provides services for human users. Cognitive agents have traditionally processed text-based queries, for example, to answer written questions formulated by human users.

Cognitive agents with natural language processing are now being implemented in a wide variety of end-user devices, such as smart phones, tablet computing devices, personal digital assistants, "smart speakers," etc. that perform tasks in response to verbal commands. Common tasks include playing music, answering questions, and ordering consumer goods and services. Voice controlled devices are gaining in popularity because speaking commands is easier and more convenient than manually specifying commands using a computing device. This is particularly true for controlling a "smart home" because users can speak commands to quickly and easily control lighting, sound systems, heating and cooling, etc., without having to pick up a controller or computing device.

Virtual assistant-enabled devices with voice control functionality are typically capable of performing a core set of capabilities or skills that are defined by the vendors of the devices. Each skill has a pre-defined command and one or more functions that are performed when the command is recognized in audio data after one or more trigger words. A trigger word is defined by the vendor and is used to signal the start of a command string. For example, a particular vendor may specify the word "Pluto" as a trigger word and define a core skill for obtaining a current weather report having the pre-defined command "weather report." A user speaks the trigger word followed by the weather report command, namely, "Pluto weather report" and a current weather report is reported to the user. Some vendors have opened their architectures to allow users to define custom skills, for example, to control other devices and interact with third-party services.

Despite the many benefits and conveniences provided by virtual assistant-enabled devices, there are some drawbacks. One drawback is that skills are typically limited to single command/response interactions, which necessitates issuing multiple commands for complex interactions. Another drawback is that users must use the platform-specific application program interface, tools, and user interfaces provided by the particular vendor of a virtual assistant-enabled device. This places significant development burdens on users, and in particular business enterprises, who purchase large numbers of virtual assistant-enabled devices from different vendors.

SUMMARY

An apparatus provides an improvement in cognitive agents in computer networks. The apparatus comprises one or more processors, one or more memories communicatively coupled to the one or more processors, and a management application executing on the apparatus. The management application is configured to generate and provide to a client device, via the one or more computer networks, a user interface that allows a user of the client device to specify a definition of a skill to be implemented with a plurality of cognitive agents across a plurality of vendor platforms. The definition of the skill specifies a condition and one or more functions to be performed in response to satisfaction of the condition, wherein the definition of the skill does not comply with a format required by any vendor platform from the plurality of vendor platforms.

An apparatus provides an improvement in cognitive agents in computer networks. The apparatus comprises one or more processors, one or more memories communicatively coupled to the one or more processors, and a management application executing on the apparatus. The management application is configured to perform receiving a first user selection of a particular skill to be deployed to a voice-activated service, and a second user selection of a particular voice-activated service on which the particular skill is to be deployed. In response to the first user selection of a particular skill to be deployed to a voice-activated service and the second user selection of a particular voice-activated service on which the particular skill is to be deployed, retrieving first source code that implements the particular skill, wherein the first source code is in a first source code format, determining a second source code format that is supported by the particular voice-activated service, wherein the second source code format that is supported by the particular voice-activated service is different than the first code format, and generating, based upon the first source code that implements the particular skill and the second source code format that is supported by the particular voice-activated service, second source code that complies with the source code format supported by the particular voice-activated service. The first and second source code may comprise one or more Java Script Object Notation (JSON) files. Also, generating and transmitting, via one or more computer networks, one or more messages to a computer system that hosts the particular voice-activated service, wherein the one or more messages provide the second source code to the computer system that hosts the particular voice-activated service and cause the particular skill to be made available to cognitive agents executing on service endpoints, wherein the one or more messages conform to an application program interface supported by the computer system.

Embodiments may be implemented by one or more non-transitory computer-readable media and/or one or more computer-implemented methods.

BRIEF DESCRIPTION OF THE DRAWINGS

In the figures of the accompanying drawings like reference numerals refer to similar elements.

FIG. 1 is a block diagram that depicts an example arrangement for configuring and deploying cognitive agents.

FIG. 2A depicts an example implementation of service endpoint.

FIG. 2B depicts an example implementation of vendor system.

FIG. 4B depicts example data included in user data.

FIG. 4C depicts example data included in cognitive Agent data.

FIG. 4D depicts example skills definitions data.

FIG. 4E depicts example conversations definitions data.

FIG. 4F depicts an example populated table of skills definitions data.

FIG. 4G depicts example conversations definitions data 468.

FIG. 5B depicts a user management screen for managing users.

FIG. 5C depicts a cognitive agents screen for managing cognitive agents.

FIG. 5D depicts a skills builder user interface screen for creating new skills.

FIG. 6A is a flow diagram that depicts an approach for registering a new user in cognitive agent system.

FIG. 6B is a flow diagram that depicts an approach for registering a new cognitive agent in cognitive agent system.

FIG. 6C is a flow diagram that depicts an approach for defining a new skill in cognitive agent system.

FIG. 6D is a flow diagram that depicts an approach for defining a new conversation in cognitive agent system.

DETAILED DESCRIPTION

Figure 3:
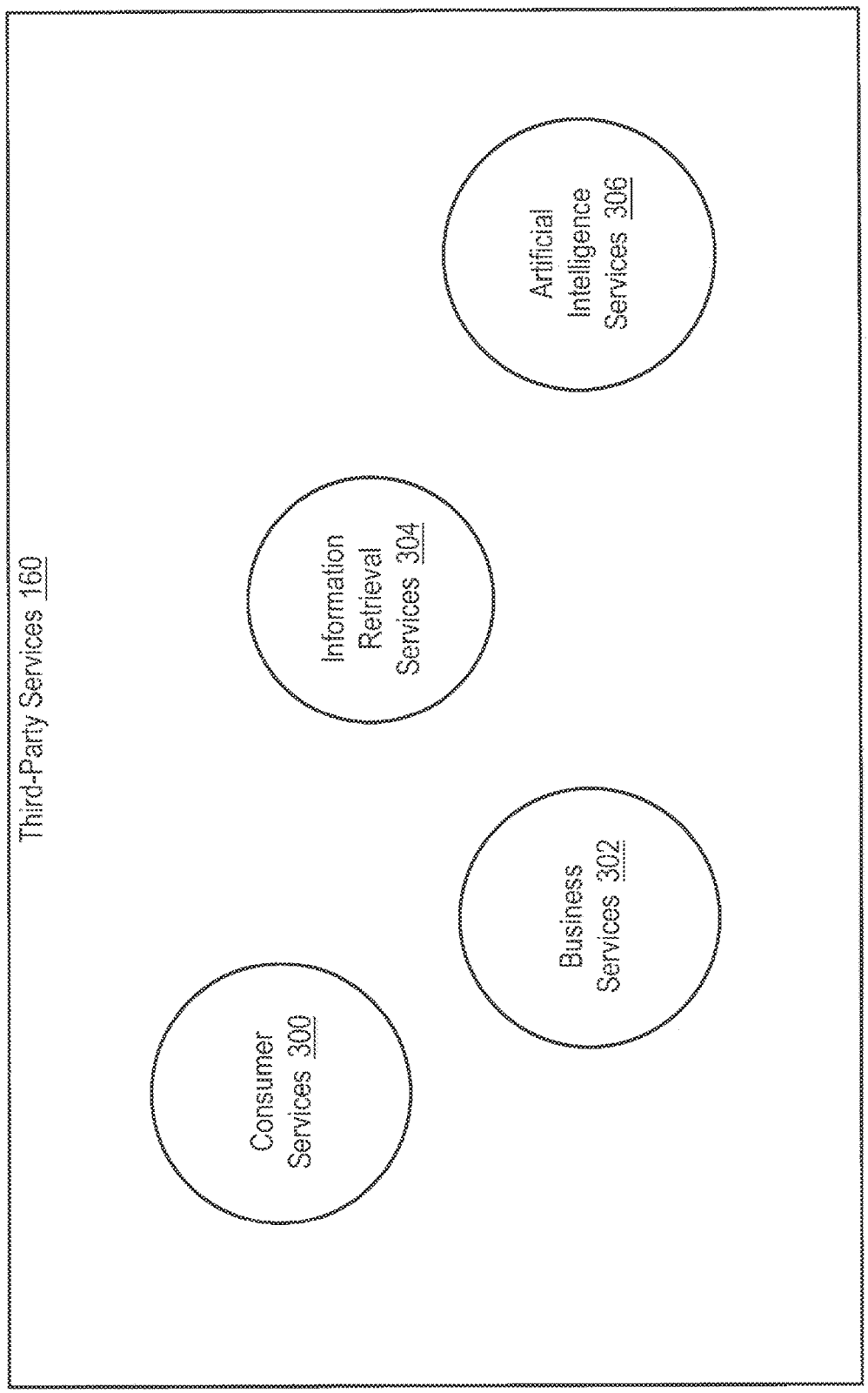
FIG. 3 depicts example third-party services.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form to avoid unnecessarily obscuring the embodiments. Various aspects of the embodiments are described hereinafter in the following sections:

I. Overview
II. Architecture
  A. Service Endpoints
  B. Vendor Systems
  C. Third-Party Services
  D. Cognitive Agent System
    i. Cognitive Agent System Manager
    ii. Processor, Storage, Communications Interface, and Application Program Interface
    iii. User Data
    iv. Cognitive Agent Data
    v. Skills Definitions Data
    vi. Conversations Definitions Data
    vii. Vendor System API Data
III. The Cognitive Agent Design Environment
  A. Main User Interface
  B. User Management
  C. Cognitive Agents
  D. Skills Builder
  E. Conversations Builder
IV. The Cognitive Agent Deployment and Execution Environment
V. Implementation Examples

I. OVERVIEW

A cognitive agent system provides a centralized capability for users to configure and deploy cognitive agents across multiple heterogeneous vendor platforms. The cognitive agent system provides a design environment that allows users to define skills, as well as a new conversation construct that supports more complex interactions with users. The cognitive agent system also includes a deployment environment that allows users to register users and cognitive agents, deploy skills and conversations, and monitor the activity of cognitive agents across multiple vendor platforms. The system is particularly beneficial to users, such as business organizations, which may own cognitive agents from different vendors. These users may use the cognitive agent system to define skills and conversations once and then deploy the skills and conversations to multiple service endpoints across different vendor platforms. In addition, the cognitive agent system allows user to directly manage cognitive agents that are not specific to any particular vendor.

II. ARCHITECTURE

FIG. 1 is a block diagram that depicts an example arrangement 100 for configuring and deploying cognitive agents. In the example depicted in FIG. 1, arrangement 100 includes vendor systems 110, 120, with corresponding service endpoints 112, 114 and 122, 124, respectively, service endpoints 130, 140, a cognitive agent system 150, third-party services 160, and a client device 170, communicatively coupled via a network 180. Embodiments are not limited to the particular arrangement 100 example depicted in FIG. 1, and embodiments may use fewer or additional elements than arrangement 100. Network 180 may be implemented by any type and number of communications links that may vary depending upon a particular implementation.

A. Service Endpoints

Vendor systems 110, 120 are vendor-specific systems provided by vendors of cognitive agent-enabled service endpoints that allow customers to manage their corresponding cognitive-enabled service endpoints. As used herein, the term "service endpoint" refers to any type of device or system that may incorporate or use a cognitive agent. Service endpoints may be simple or complex, depending upon a particular implementation, and embodiments are not limited to any particular type of service endpoint. Service endpoints may be stand-alone devices or services, or may be implemented in, or be subsystems of, other devices. Examples of service endpoints include, without limitation, video conferencing equipment, interactive whiteboard (IWB) appliances, smart speakers, smart phones, personal computers, tablet computing devices, personal digital assistants, room controls, scrum boards, database management systems, source code repositories, software development systems, such as software bug management systems, remote assistants, financial applications, design system exercises, for example IBM's Design Thinking, etc.

According to an embodiment, some service endpoints are associated with a particular vendor system. For example, service endpoints 122, 124 are sold and managed by vendor system 120, while service endpoints 112, 114 are sold and managed by vendor system 110, as described in more detail hereinafter. Service endpoints 130, 140 are not associated with, and managed by, any particular vendor system, and instead are independent service endpoints that are directly managed by cognitive agent system 150, without the use of vendor systems 110, 120, as described in more detail hereinafter. For example, service endpoints 130, 140 may be implemented using generic components and a generic or custom cognitive agent that is not specific to a particular vendor. When operating, service endpoints 130, 140 communicate with cognitive agent system 150, for example to provide captured audio data and receive responses, instead of a vendor system.

FIG. 2A depicts an example implementation of a service endpoint that may be applicable to any of the service endpoints depicted in FIG. 1. In this example, service endpoint 122 includes an output component 200, a sound detection component 202, a command detection component 204, a processor 206, storage 208, a communications interface 210, and a cognitive agent 212. Embodiments are not limited to service endpoints having the exact elements depicted in FIG. 2A and are applicable to service endpoints having additional or fewer elements, depending upon a particular implementation. As one example, service endpoint 122 may include one or more user controls, such as switches, buttons, slides, etc.

Output component 200 is configured to provide output to a user of service endpoint 122. The output may be in the form of audio output, video output, text output, image output, or any combination thereof. Example implementations of output component 200 include, without limitation, one or more speakers, displays, etc.

Sound detection component 202 is a component that is capable of detecting sound and generating sound data that represents the detected sound. Sound detection component 202 may be implemented, for example, by one or more microphones and associated computer hardware and/or computer software. Sound detection component may be configured to operate continuously, at specified times, or in response to a user selection of a control on service endpoint 122.

Command detection component 204 is configured to detect one or more trigger words in audio data generated by sound detection component 202. Command detection component 204 may be implemented, for example, by a process that analyzes audio data generated by sound detection component 202 to identify one or more trigger words.

Processor 206 may be implemented by one or more microprocessors, and associated hardware, to provide a computer architecture for supporting, for example, an operating system, one or more processes, etc. Storage 208 is any type of storage, including non-volatile memory and volatile memory, for storing data, such as audio data generated by sound detection component 202, and for supporting the execution of processes by processor 206. Communications interface 210 is configured to provide communications between service endpoint 122 and other devices. Example implementations of communications interface 210 include one or more wired or wireless interfaces.

Cognitive agent 212 is configured to perform tasks or provide services for human users. Cognitive agent 212 may be implemented, for example, by a process executing on service endpoint 122. The process may be an application program, embedded code, etc. Examples of cognitive agent 212 include, without limitation, Ricoh's Rita, Amazon's Alexa, Google's Assistant, Microsoft's Cortana, IBM's Watson, and Apple's Siri. As previously mentioned herein, cognitive agent 212 may also be a generic or custom cognitive agent that is not specific to a particular vendor.

According to one embodiment, cognitive agent 212 is configured to capture and transmit audio data containing command strings to vendor system 120 for processing. The capture of audio data may start upon detection of the one or more trigger words, for example, by command detection component 202, and end upon detection of specified duration of silence, representing a pause, or one or more end command words. Trigger words may be specified, for example, by configuration data stored in storage 208. Cognitive agent 212 is further configured to receive and process a response to the audio data from vendor system 120. The response may include, for example, information requested in a command. Cognitive agent 212 displays and/or plays the response via output component 200. For example, suppose that service endpoint 122 is configured with the trigger word "Apollo" and a user of service endpoint 122 speaks the command string "Apollo current weather," followed a pause, or an end command. The command string is detected and transmitted by cognitive agent 212 to vendor system 120. Vendor system 120 processes the command string and provides a response of "Sunny, 75 degrees" to service endpoint 122. The response may be audio data, text data, image data, video data, or any combination thereof, depending upon a particular implementation. For example, in the context of a "smart speaker" service endpoint, the response may be audio data. In the context of a service endpoint that includes both a speaker and a display, the response may include both audio data and text data. Cognitive agent 212 processes and conveys the response to the user of service endpoint 122, for example, by displaying and/or playing the response via output component 200.

The elements of FIG. 2A are depicted as separate for purposes of explanation, but one or more of the elements may be included in other elements. For example, the functionality performed by command detection component 204 may be implemented in cognitive agent 212.

B. Vendor Systems

Vendor systems 110, 120 each provide a platform for managing cognitive agents of a corresponding vendor. Vendor systems 110, 120 may be implemented, for example, on one or more network servers. One non-limiting example of vendor systems 110, 120 is Amazon's system for managing the cloud-based Alexa Voice Service (AVS).

FIG. 2B depicts an example implementation of vendor system 120. Embodiments are not limited to the example depicted in FIG. 2B and embodiments may include fewer or additional elements that may vary depending upon a particular implementation. In addition, although depicted and described in the context of vendor system 120, the example depicted in FIG. 2B is applicable to any vendor system.

In the example depicted in FIG. 2B, vendor system 120 includes a vendor system manager 220, an application program interface (API) 222, a processor 224, storage 226, a communications interface 228, and data 230.

Vendor system manager 220 perform numerous management functions, including managing users, cognitive agents, and skills. According to one embodiment, vendor system manager 220 provides a user interface, for example a Web-based user interface, that allows customers to create and manage user accounts, configure cognitive agents, and select skills that they would like to use. Some cognitive agents are preconfigured to use a set of pre-defined core skills. These are typically skills that many users would find useful for a particular cognitive agent-enabled device, such as a smart speaker for the home. The user interface allows a user to select additional skills that the user would like to use with their cognitive agent-enabled device, such as a smart speaker, and may also allow users to create and manage custom skills. The functions performed by vendor system manager 220 and the user interface provided by vendor system manager 220 may be unique to each vendor system 110, 120.

API 222 includes function definitions, protocols, and tools that allow processes to interact with, and invoke the functionality of, vendor system manager 220. According to one embodiment, this includes the ability to upload skills definition data, configure cognitive agents, and manage users. API 222 may be unique to each vendor system 110, 120. As described in more detail hereinafter, cognitive agent system 150 uses the API 222 of each vendor system 110, 120 to manage users and cognitive agents across multiple vendor systems in a vendor agnostic manner. Although embodiments are described herein in the context of vendor systems 110, 120 having an API, embodiments are not limited to these examples and the approaches described herein may be used with vendor systems that have an API that does not support uploading of skill definitions data or no API at all. For example, according to an embodiment, skills definitions data may be represented in data files, such as JSON files, or collections of files, such as ZIP files.

Processor 224 may be implemented by one or more microprocessors, and associated hardware, to provide a computer architecture for supporting, for example, an operating system, one or more processes, etc. Storage 226 is any type of storage, including non-volatile memory and volatile memory, for storing data 230. Communications interface 228 is configured to provide communications between vendor system 120 and other devices, such as service endpoints, client devices, third-party services 160, cognitive agent system 150, etc. Example implementations of communications interface 210 include one or more wired or wireless interfaces.

Data 230 includes user data 232, cognitive agent data 234, and skills definitions data 236. User data 232 includes data for registered users, such as a user ID, login credentials, business organization affiliation (if any), IDs of the particular user's cognitive agents (and service endpoints), and data that identifies skills, including custom skills, selected for the user's cognitive agents. Cognitive agent data 234 includes configuration data for cognitive agents. Example configuration data includes, without limitation, a cognitive agent ID, a type of cognitive agent, a corresponding service endpoint, location, capabilities, usage, skills, etc. Skills definitions data 236 defines skills available via vendor system 120. This may include skills available for use by all users, as well as custom or private skills. Skills definitions data 236 specifies attributes for each defined skill, including a skill name, command, and one or more corresponding functions. One example implementation of skills definitions data 236 is JSON configuration files that define spoken commands and an intent name.

C. Third-Party Services

Third-party services 160 may include a wide variety of third-party services that may vary depending upon a particular implementation. FIG. 3 depicts example third-party services 160. In the example depicted in FIG. 3, third-party services 160 include consumer services 300, business services 302, information retrieval services 304, and artificial intelligence services 306, but embodiments are not limited to these example services.

Consumer services 300 include any service used by consumers. Examples of consumer services 300 include, without limitation, product vendor services, food services, transportation services, data services, and financial services.

Business services 302 are services that are used by business organizations and may include business services that are general and applicable to multiple business organizations, as well as business services that are specific to particular business organizations. Examples of business services 302 include, without limitation, product vendor services, transportation services, and data services. One example of a business service that is specific to a particular business organization is a service that provides information about the particular business organization, such as product or service information, project information, employee data, business records, meeting information, etc.

Information retrieval services 304 include any type of service that retrieves information in response to a query. Artificial intelligence services 306 are any type of service that uses any form of artificial intelligence, for example to answer a query.

Client device 170 is a computer device that allows a user to interact with cognitive agent system 150 as described herein. Examples of client device 170 include, without limitation, a personal computer, a tablet computing device, a personal digital assistant, a smart phone, etc.

D. Cognitive Agent System

Cognitive agent system 150 provides a centralized capability for users to configure cognitive agents on devices across multiple vendor platforms in a vendor agnostic manner, and also cognitive agents that are not associated with a particular vendor. Cognitive agent system 150 provides a design environment that allows users to define skills, as well as a new conversation construct that supports more complex interactions with users. Cognitive agent system 150 also provides a deployment environment that allows users to configure and monitor the activity of cognitive agents across multiple vendor platforms.

Figure 4A:
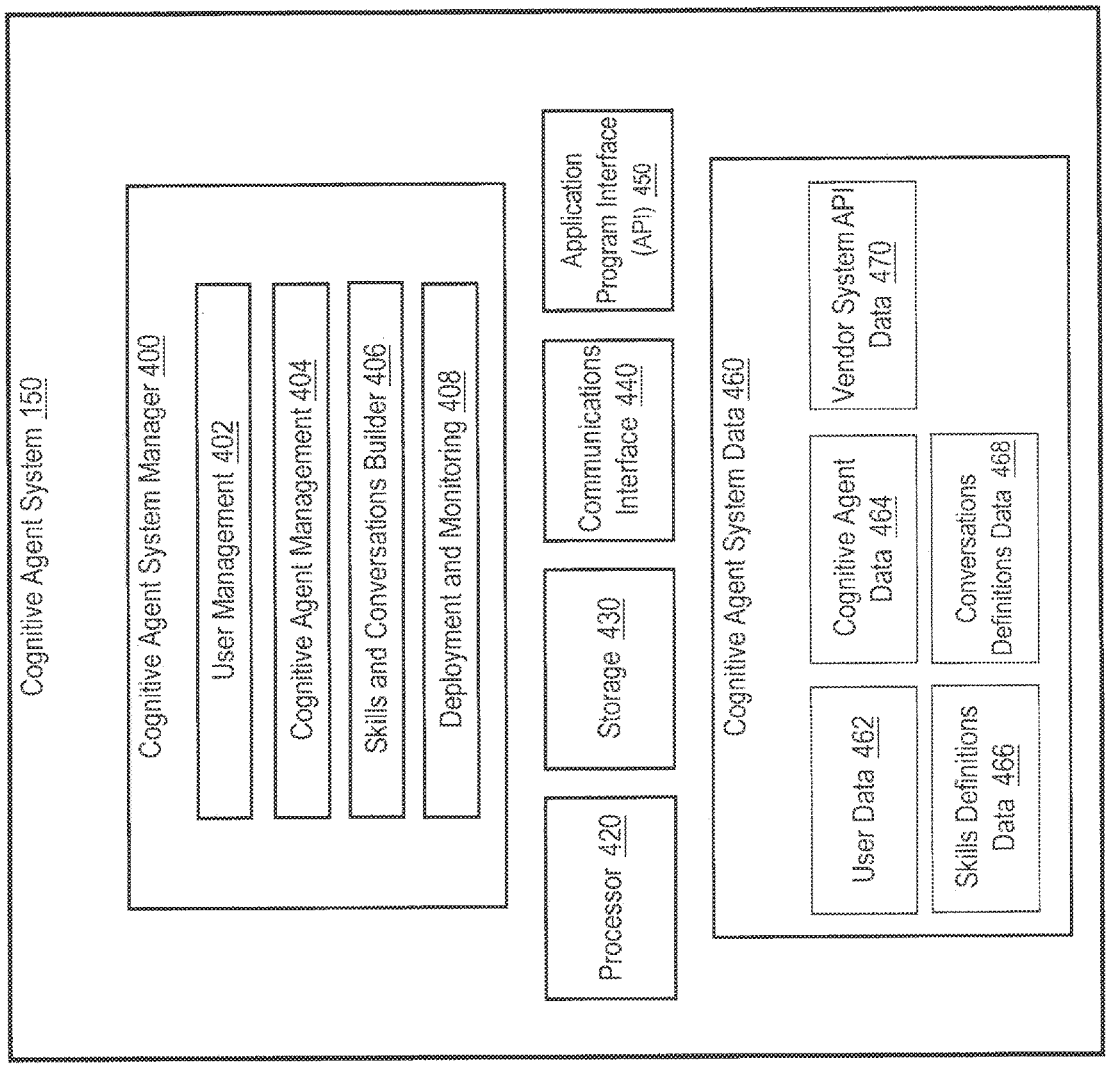
FIG. 4A depicts an example implementation of cognitive agent system.

FIG. 4A depicts an example implementation of cognitive agent system 150. In the example depicted in FIG. 4A, cognitive agent system 150 includes cognitive agent system manager 400, a processor 420, storage 430, a communications interface 440, an application program interface 450, and cognitive agent system data 460.

i. Cognitive Agent System Manager

According to one embodiment, cognitive agent system manager 400 includes user management 402, cognitive agent management 404, a skills and conversation builder 406, and deployment and monitoring 408 functions. User management 402 allows user to register and manage users of cognitive agent system 150. Cognitive agent management 404 allows user to register and manage cognitive agents. Skills and conversation builder 406 allows users to define skills and a new conversation construct that supports complex interactions with users. Deployment and monitoring manager 408 provides functionality that allows user to configure cognitive agents across multiple vendor systems and monitor their performance.

ii. Processor, Storage, Communications Interface, and Application Program Interface Processor 420 may be implemented by one or more microprocessors, and associated hardware, to provide a computer architecture for supporting, for example, an operating system, one or more processes, etc. Storage 430 is any type of storage, including non-volatile memory and volatile memory, for storing cognitive agent system data 460. Communications interface 440 provides communications between cognitive agent system and other devices and processes, such as service endpoints, client devices, third-party services 160, vendor systems 110, 120, etc. Example implementations of communications 210 include one or more wired or wireless interfaces. API 450 includes function definitions, protocols, and tools that allow processes to interact with, and invoke the functionality of, cognitive agent system 150.

iii. User Data

Cognitive agent system data 460 includes user data 462, cognitive agent data 464, skills definitions data 466, conversations definitions data 468, and vendor system API data 470. Each of these types of data is described hereinafter.

User data 462 includes data for users of cognitive agent system 150. FIG. 4B depicts example data included in user data 462. In the example depicted in FIG. 4B, user data 462 includes a user name, login credentials, contact information, an organization, a cognitive agent ID, a service endpoint, associated devices, skills, conversations, authentication data, and status.

The user name is any name assigned to the user and the login credentials may include, for example, a user ID and password. According to one embodiment, cognitive agent system 150 supports many different types of users, and is not limited to individual human users. For example, any type of logical entity may be registered as a user including, for example, organizations, groups, departments, projects, work areas, etc., as well as individuals, may be registered as users in cognitive agent system 150. As another example, devices may also be registered as users, such as IWB appliances, printers, MFPs, conference rooms, etc. The contact information may be any type of contact information, such as an email. The cognitive agent ID is data that uniquely identifies a cognitive agent of the user, such as a serial number. The service endpoint ID is data that uniquely identifies a service endpoint on which the cognitive agent is implemented. For example, the service endpoint ID may uniquely identify service endpoint 122. The associated device IDs is data that uniquely identifies one or more devices that are associated with the cognitive agent. For example, a cognitive agent may be implemented on a smart speaker that is adjacent or attached to a multi-function peripheral (MFP), or several MFPs and other devices, and the associated device IDs are used to provide service for the associated devices, as described in more detail hereinafter. Skills and conversations are data that identify skills and conversations associated with the user, and that may be selected for, i.e., assigned to, cognitive agents of the user. Authentication data is data that is used to authenticate the user and bind together the user, the cognitive agent, the service endpoint, and the skills and conversations. Status is a current status of the user. Example values for status include, without limitation, "not authenticated," "authenticated—not yet registered on vendor system," and "authenticated—registered on vendor system X," where X is data that identifies the vendor system of the cognitive agent assigned to the user. In situations where users have multiple cognitive agents, for example an organization user that has multiple cognitive agent-enabled devices, either multiple instances of user data 462 may be used for the user, or a single instance of user data 462 may include data for all of the user's cognitive agents. Any type of data structure and/or format may be used to accommodate multiple cognitive agents for a single user including, for example, linked lists, tables, pointers, etc.

iv. Cognitive Agent Data

Cognitive agent data 464 includes configuration data for cognitive agents. This may include an instance of cognitive agent data 464 for each cognitive agent on the service endpoints depicted in FIG. 1. FIG. 4C depicts example data included in cognitive agent data 464. In the example depicted in FIG. 4C, cognitive agent data 464 includes a cognitive agent ID, a type and version, a vendor ID, a service endpoint ID, associated device IDs, a user ID, skills, conversations and a status.

The cognitive agent ID is data that uniquely identifies the cognitive agent, such as a serial number. The type and version specifies a type and version (if applicable) of the cognitive agent. For example, the type may identify the cognitive agent as an Amazon Alexa cognitive agent. The version may indicate a particular version of Alexa cognitive agent. The vendor ID is data that uniquely identifies the vendor, such as Amazon, of the cognitive agent and/or the service endpoint on which the cognitive agent is implemented. The service endpoint ID is data that identifies the service endpoint, e.g., a device, on which the cognitive agent is implemented and executes.

The data model depicted in FIG. 4C provides support for multiple cognitive agents being implemented on a single device. For example, multiple cognitive agents of different types and with different capabilities may be implemented on a single device. The associated device IDs is data that uniquely identifies one or more devices that are associated with the cognitive agent, as previously described herein with respect to user data 422. As described in more detail hereinafter, the associated device IDs allow a cognitive agent to be bound to one or more associated devices so that functions, such as service requests, may be performed with respect to the associated devices.

The user ID is data that uniquely identifies the user associated with the cognitive agent. Skills and conversations are data that identify skills and conversations selected for, i.e., assigned to, the cognitive agent, and the skills and conversations selected for a cognitive agent may be a subset of the skills and conversations associated with the user. This feature provides significant benefits in many applications. For example, in the context where a business organization is a designated user and has a large number of skills and conversations, it allows subsets of skills and conversations to be selectively bound to particular cognitive agents. This is useful in situations where it is undesirable to have every cognitive agent access all of the skills and conversations of the business organization.

Status is a current status of the cognitive agent, such as not configured, configured—normal, configured—error, etc. The status field indicates the current status of a cognitive agent. For example, the value of the status field may specify whether the cognitive agent has been deployed and if so, the vendor systems to which the cognitive agent has been deployed.

v. Skills Definitions Data

Skills definitions data 466 specifies attributes for each of a plurality of skills. FIG. 4D depicts example skills definitions data 466. In the example depicted in FIG. 4D, skills definitions data 466 includes a skill name, a skill ID, a skill type, a command, one or more functions, and status. The skill name specifies the name of a skill and may be, for example, an alphanumeric string. The skill ID is data that uniquely identifies the skill and may be, for example, an alphanumeric string. The skill type is a type or category of skill. The command is a recognized command used to invoke the skill. Commands may include variables to allow a spoken command to be accompanied by one or more values that are used during invocation of the spoken command. For example, a "Set Temperature" command may include a variable, sometimes referred to as a "slot," for a temperature value. Thus, a user may speak the command "Set Temperature to 70 degrees," where "Set Temperature to" is the command and "70 degrees" is the value of the variable. The functions are one or more functions or actions performed by the skill, and a skill may perform any number of functions and functions may include not only an action, but a response, such as a confirmation. The functions may be analogous to Amazon intents. The status field indicates the current status of a skills definition. For example, the value of the status field may specify whether the skill has been deployed and if so, the vendor systems to which the skill has been deployed.

FIG. 4F depicts an example populated table of skills definitions data 466, where each row in the table corresponds to a particular skill. The first row in the table corresponds to a skill named "Lights On" with a skill ID of "HC093." The skill type of "Home Control" indicates that the skill is related to home control functionality, sometimes referred to as "smart home." The command of "Lights On" is a human utterance that is used by a vendor system and cognitive agent system 150 to associate audio data with the "Lights On" skill. More specifically, when a vendor system and cognitive agent system 150 process audio data received from a cognitive agent, for example using speech recognition, words immediately following a trigger word are assumed to be commands and are compared to the commands specified by skills definitions data 466 to identify a particular command spoken by a user. Continuing with the current example, the function for the "Lights On" skill is "Turn Lights On." When a vendor system or cognitive agent system 150 determines that the command following the trigger word is "Lights On," which corresponds to the "Lights On" skill, the vendor system or cognitive agent system 150 causes the code for the skill to be executed. Execution of the code causes the functions to be performed, which in the present example, turns the lights on in a room or at another location, for example, exterior lights. Skills may have multiple corresponding commands that are similar to provide more flexibility and a more favorable user experience. For example, as depicted in FIG. 4F, the skill "Lights On" may have corresponding commands "Lights On" and "Turn Lights On" to invoke the skill. In addition, although each row depicted in FIG. 4F corresponds to a different skill, this is done for purposes of explanation, and multiple functions may be grouped into a single skill. For example, the four skills of the skill type "Home Control" may be grouped together into a single "Home Control" skill.

As previously described, performance of the functions may also include a confirmation, such as a verbal or visual confirmation. For example, a confirmation may include sending audio data to a cognitive agent which, when played at a service endpoint, causes an audio confirmation to be played. As another example, a confirmation may include sending text to the cognitive agent that is displayed on a display at the service endpoint. As yet another example, a confirmation may include sending a signal to a cognitive agent that causes a light to be illuminated to confirm that the command was received and successfully processed.

In addition, performance of functions may include multiple functions that are performing serially or in parallel to perform multiple tasks. Further, the output of one function may be used as an input to another function. For example, a first function, such as a search function, may be invoked that provides a first result, such as a query result, that is used as an input to a second function. Skills may implement logic to control the performance of functions. In addition, the functions may include the use of third-party services 160, for example, information services and artificial intelligence services to process queries.

As used herein, the terms "code" and "source code" are used synonymously to refer to computer instructions, typically in human-readable form, which when processed by a computer, cause the computer to perform one or more functions. One embodiment of source code or code is one or more JSON configuration files. Code and source code may be directly processable by a computer, or may processed into another format before being processable by a computer. For example, source code or code may be scripting language statements, or a high-level language that is compiled into object code that is linked to form an executable that may is processable by a computer. Code may be maintained by cognitive agent system 150 in skills definitions data 466, while vendor systems may maintain code for skills on a special service, for example, a cloud service. Code may be manually generated and uploaded to cognitive agent system 150 by an administrative user and then uploaded to vendor systems during the deployment phase described in more detail hereinafter.

While skills definitions data 466 may define all skills, not all defined skills are necessarily used with each cognitive agent. As described herein, particular skills may be bound to users and cognitive agents. Thus, some cognitive agents may work with only a subset of the available skills.

In some situations, skills definition data 432 does not comply with the API of vendor systems 110, 120. As described in more detail hereinafter, during the configuration of cognitive agents, cognitive agent system 150 handles implementing a skill in a target vendor system 110, 120 using the corresponding API of vendor system 110, 120. This includes performing any data/protocol conversion required to implement a skill in the target vendor system 110, 120.

vi. Conversations Definitions Data

Cognitive agent system provides support for a conversation construct that extends the skills construct to more complex interactions. As used herein, the term "conversation" refers to multiple, related interactions that are initially invoked by a single command. The interactions may be manually pre-specified, for example, by an administrative user, when the interactions are known and/or fixed. Alternatively, the interactions may be dynamically determined based upon data types defined for the conversation, providing more cognitive capabilities. During runtime, the code that implements a conversation includes logic that determines whether a datatype, or attribute of a datatype, specified for a particular interaction includes multiple values. If so, then the user is automatically queried to select one of the data values to enable the process to continue. If not, then the process continues to the next interaction.

For example, suppose that user invokes a call conversation to initiate a call with another person, e.g., by speaking "Apollo call." The call conversation used a person data type that defines attributes of individuals, such as last name, first name, a number attribute with several values, such as cell number, office number, and home number, a mailing address and an email address. Logic in the call conversation determines that there are multiple instances of the person data type and queries the user to specify a particular person. After the user selects a particular person, the logic checks the instance of the person data type for the particular person selected by the user and determines that there are multiple values for the number attribute. Since there are multiple values for the number attribute, the logic queries the user to select a particular number. After the user selects a particular number, the logic initiates the call with the selected number.

Using datatypes in this manner provides support for more complex interactions without having to code every possible choice in advance. In addition, the approach automatically adapts to changes in data without having to change the code that implements the conversation. For example, the addition or removal of a person, or the addition, removal, or change to a person's number does not require a change to the code.

Conversations definitions data 468 specifies attributes for each defined conversation and FIG. 4G depicts example conversations definitions data 468. In the example depicted in FIG. 4G, conversations definitions data 466 includes a conversation name, a conversation ID, a conversation type, a command, one or more functions, one or more data types, and a status. The conversation name specifies the name of a conversation and may be, for example, an alphanumeric string. The conversation ID is data that uniquely identifies the conversation and may be, for example, an alphanumeric string. The conversation type is a type or category of conversation. The command is a spoken command used to invoke the conversation. The functions are one or more functions performed by the conversation and the data types are used by the functions. The status field indicates the current status of a conversation definition. For example, the value of the status field may specify whether the conversation has been deployed and if so, the vendor systems to which the conversation has been deployed.

vii. Vendor System API Data

Vendor system API data 470 may include any data that is needed by cognitive agent system 150 to access vendor systems to create and manage (including registering, activating, and implementing) users, cognitive agents, skills, and conversations. This may include data that defines the API of each of a plurality of vendor systems, as well as other data used by cognitive agent system 150 to manage users, cognitive agents, skills, and conversations on the vendor system platforms.

III. THE COGNITIVE AGENT DESIGN ENVIRONMENT

According to one embodiment, cognitive agent system 150 provides a cognitive agent design environment that allows users to design skills and conversations for implementation on multiple vendor systems using a common user interface. As described hereinafter, cognitive agent system 150 also provides tools for deploying, i.e., configuring cognitive agents across multiple vendor systems that implement different APIs and user interfaces, and also monitoring cognitive agents. In the following examples, user interface screens may be Web-based, i.e., implemented by one or more Web pages generated and/or provided by cognitive agent system 150. Data may be entered into data fields by users manually typing data or by selecting user interface controls, such as pulldown menus, lists, buttons, etc. Data type/format enforcement may be implemented to ensure that data that is entered complies with a particular type, format, value range, etc., for a particular field.

A. Main User Interface

Figure 5A:
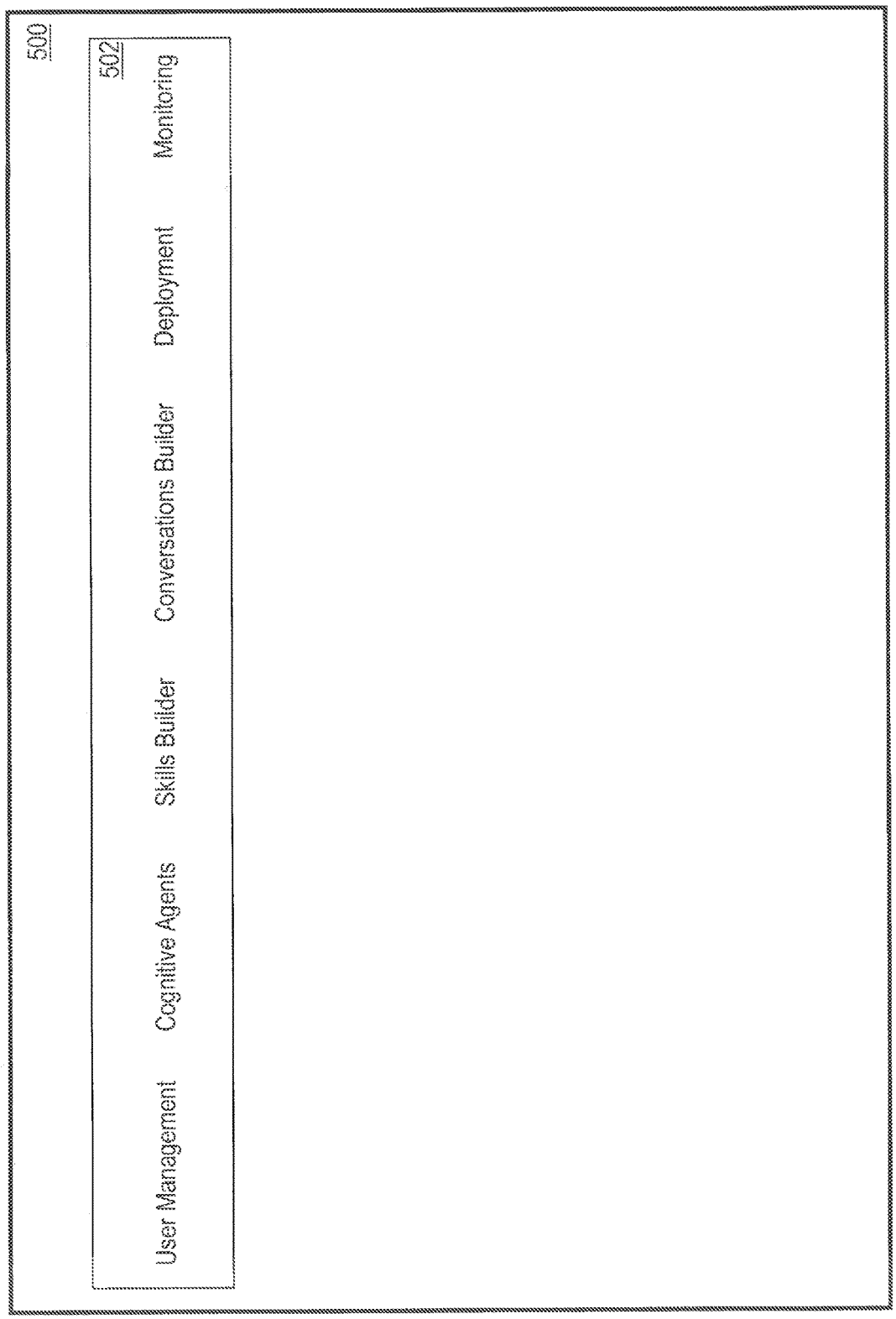
FIG. 5A depicts an example main user interface screen for the cognitive agent system environment.

FIG. 5A depicts an example main menu user interface screen 500 for the cognitive agent system environment. Main menu user interface screen 500 may be implemented, for example, as a Web-based user interface by one or more Web pages accessed by a user of client device 170. Access to main menu user interface screen 500 may be conditioned upon successful user authentication, for example, by querying a user for user credentials and then verifying the user credentials provided by the user. Main menu user interface screen 500 includes controls 502 that allows users to access different functionality provided by cognitive agent system 150. In the example depicted in FIG. 5, controls 502 provide access to user management, a skills builder, a conversation builder, deployment, and monitoring. Each of these functional areas are described in more detail hereinafter.

B. User Management

FIG. 5B depicts a user management screen 510 for managing users. User management screen 510 may be displayed in response to a user selecting the "User Management" control from controls 502 on main menu user interface screen 500. In the example depicted in FIG. 5B, user management screen 510 displays a list of current registered users 512 and controls 514 that allow a user to register a new user, edit the user data for a currently-registered user, or delete a currently-registered user.

In FIG. 5B the current user is "User 3." A user data window 516 displays the user data for the currently-selected user. Each of the user data fields in user data window 516 corresponds to the data in user data 462 and may be directly edited by selecting a field and changing the data contained in the selected field, except for the status field that is read-only. In situations where a particular user, such as an organization, has multiple cognitive-enabled devices, controls, such as pulldown lists, etc., may be provided to specify information for each cognitive-enabled device. Controls 518 allow a user to save or discard changes. In response to a request to save changes, user data 462 is updated accordingly. A control 501 allows a user to return to main menu user interface screen 500.

Registering a new user is accomplished by a user selecting the "New" control from controls 514, entering data into user data window 516, followed by selecting the "Save" control from controls 518. According to one embodiment, when a request is received to register a new user by selection of the "Save" control from controls 518, authentication data is generated and stored in user data 462. The authentication data may be, for example, an alphanumeric code. The authentication data may be valid for a limited period of time, for example, based upon an expiration date. The authentication data is sent to the contact information for the new user, and the user is queried to enter the authentication data. The data entered by the user is compared to the authentication data stored in user data 462 and if they do not match, the user is given one or more additional opportunities to enter the correct authentication data. Authentication may also be performed after data for a current user is changed and saved.

Once the data entered by the user matches the authentication data stored in user data 462 for the user, then the user is registered on cognitive agent system 150 and the value of status in the user data 462 for the user may also be changed to indicate that the user is now registered on cognitive agent system 150. In addition, the user automatically is registered in the vendor system of the user's assigned cognitive agent.

According to one embodiment, this is accomplished by cognitive agent system 150 generating and transmitting one or more messages to the vendor system to register the user in the vendor system. The messages conform to the API of the vendor system.

FIG. 6A is a flow diagram 600 that depicts an approach for registering a new user in cognitive agent system 150. In step 602, a user accesses user management screen 510 by selecting the "User Management" option from controls 502 on main menu user interface screen 500. In step 604, the user requests to register a new user by selecting the "New" control from controls 514. In step 606, the user provides information for the new user by entering the information in user data window 516 and selecting the "Save" control from controls 518.

In step 608, authentication data is generated sent to the contact information for the new user, such as an email address, and the user is queried to enter the authentication data. The authentication data may be, for example, a randomly-generated alphanumeric code and the user may be queried to enter the authentication data via a pop-up window displayed on user management screen 510.

In step 610, the user enters the authentication data and the data entered by the user is verified by comparing the data entered by the user to the authentication data stored in user data 462 for the user. After the user successfully enters the correct authentication data, then in step 612, the user is registered on cognitive agent system 150 and the value of status in the user data 462 for the user is updated to indicate that the user is now registered on cognitive agent system 150.

In step 614, the new user is automatically registered in the appropriate vendor system. According to one embodiment, cognitive agent system manager 400 uses the cognitive agent ID from the user's user data 462 to access the appropriate cognitive agent data 464 and identify the vendor system (via the Vendor ID) of the cognitive agent associated with the user. Cognitive agent system manager 400 then uses vendor system API data 470 to generate and transmit one or more messages to the vendor system to register the user in the vendor system. According to one embodiment, this includes binding the user, cognitive agent, skills, and conversations in the vendor system. The messages conform to the API of the vendor system.

According to an embodiment, a new user is not automatically registered in a vendor system. Instead, the new user is registered in cognitive agent system 150 and the registering of the new user in the vendor system may be requested by a user, for example by selecting a control from user management screen 510, or during deployment, as described in more detail hereinafter.

Once cognitive agent system manager 400 receives a confirmation from the vendor system that the user has been registered, cognitive agent system manager 400 updates the status in the user's user data 462 to specify that the user has been registered in both cognitive agent system 150 and the vendor system. For example, the status may be changed to "authenticated—registered on vendor system X." At this point, the user is registered in both cognitive agent system 150 and the vendor system, and bound to a cognitive agent and a set of skills and conversations.

According to an embodiment, in response to a change in user data, such as a user's cognitive agent, skills or conversations, cognitive agent system manager 400 updates the registration information in the appropriate vendor system. For example, in response to a user adding a skill via user management screen 510, cognitive agent system manager 400 generates and transmits one or more messages to update the skills that are bound to the user in the vendor system. This may be done in a variety of ways, for example, by issuing messages that conform to an API of the vendor system. For vendor systems that have a limited API, or no API, the registration information may be updated by interacting programmatically with a Web-based user interface of the vendor system.

In the situation where a cognitive agent, skill, or conversation that exists in cognitive agent system 150, but that is not currently implemented in the vendor system, is added to the user, then the cognitive agent, skill, or conversation is automatically added to the vendor system, as described in more detail hereinafter. In the situation where the service endpoint for a user is changed to a different vendor, then the user is registered with the new vendor system. The user may also be unregistered with the prior vendor system, if the user is no longer associated with any cognitive agents of the prior vendor system.

C. Cognitive Agents

FIG. 5C depicts a cognitive agents screen 520 for managing cognitive agents. Cognitive agents screen 520 may be displayed in response to a user selecting the "Cognitive Agents" control from controls 502 on main menu user interface screen 500. In the example depicted in FIG. 5C, cognitive agents screen 520 displays a list of current cognitive agents 522 registered in cognitive agent system 150 and controls 524 that allow a user to register a new cognitive agent, edit the data for a currently-registered cognitive agent, or delete a currently-registered cognitive agent.

In FIG. 5C the currently-selected cognitive agent is "Cognitive Agent 3." A cognitive agent data window 526 displays the data for the currently-selected cognitive agent. Each of the data fields in cognitive agent data window 526 corresponds to the data in cognitive agent data 464 and may be directly edited by selecting a field and changing the data contained in the selected field, except for the "Status" field, which is read-only. Controls 528 allow a user to save or discard changes. In response to a request to save changes, cognitive agent data 464 is updated accordingly. A control 501 allows a user to return to main menu user interface screen 500.

Registering a new cognitive agent is accomplished by a user selecting the "New" control from controls 524, entering data into cognitive agent data window 526, followed by selecting the "Save" control from controls 528. When a request is received to register a new cognitive agent by selection of the "Save" control from controls 528 then the cognitive agent is registered on cognitive agent system 150 and the value of status in the cognitive agent data 464 for the cognitive agent is changed to indicate that the cognitive agent is now registered on cognitive agent system 150. This includes binding the cognitive agent, service endpoint, user, and the skills specified for the cognitive agent. According to one embodiment, the cognitive agent is also bound to any associated devices specified by the associated device IDs. This provides the capability to pair a cognitive agent with one or more associated devices and is beneficial, for example, for actions performed by a skill or conversation that apply to the associated devices, for example, service requests.

According to one embodiment, the cognitive agent is automatically registered in the corresponding vendor system based upon the Vendor ID in cognitive agent data 464. This is accomplished by cognitive agent system 150 generating and transmitting one or more messages to the vendor system to register the cognitive agent in the vendor system. The messages conform to the API of the vendor system. Some vendor systems that are based upon a one-to-one relationship between users and cognitive agents actually or effectively bind all of a user's skills to the user's cognitive agent. The approach described herein binds the skills specified for a cognitive agent to the cognitive agent. This provides more flexibility and benefits in situations where the user is a logical group, such as an organization, which has multiple cognitive agents, because it allows different subsets of skills of the organization to be bound to different cognitive agents.

FIG. 6B is a flow diagram 620 that depicts an approach for registering a new cognitive agent in cognitive agent system 150. In step 602, a user accesses cognitive agents screen 520 by selecting the "Cognitive agents" option from controls 502 on main menu user interface screen 500. In step 604, the user requests to register a new cognitive agent by selecting the "New" control from controls 524. In step 606, the user provides information for the new cognitive agent by entering the information in cognitive agent data window 526 and selecting the "Save" control from controls 528. The authentication process previously described herein with respect to registering new users may be used when registering new cognitive agents.

In step 628, the new cognitive agent is registered in cognitive agent system 150. This may include updating cognitive agent data 464 to include the data entered by the user into cognitive agents screen 520.

According to an embodiment, in step 630, the new cognitive agent is automatically registered in the vendor system that corresponds to the vendor ID specified by the user. This may be done in a variety of ways, for example, by issuing messages that conform to an API of the vendor system to register the cognitive agent in the vendor system. For vendor systems that have a limited API, or no API, the registration information may be updated by interacting programmatically with a Web-based user interface of the vendor system. To accomplish this, cognitive agent system manager 400 uses vendor system API data 470 to generate and transmit one or more messages to the vendor system to register the cognitive agent in the vendor system. The messages conform to the API of the vendor system and the result is that the user and cognitive agent are bound in the vendor system.

Once cognitive agent system manager 400 receives a confirmation from the vendor system that the cognitive agent has been registered, cognitive agent system manager 400 updates the status in the cognitive agent data 464 to specify that the cognitive agent has been registered in the vendor system. For example, the status may be changed to "authenticated—registered on vendor system X." At this point, the cognitive agent is registered in the vendor system and bound to a user, service point, skills, and optionally associated devices.

According to an embodiment, a new cognitive agent is not automatically registered in a vendor system. Instead, the new cognitive agent is registered in cognitive agent system 150 and the registering of the new cognitive agent in the vendor system may be requested by a user, for example by selecting a control from cognitive agents screen 520, or during deployment, as described in more detail hereinafter.

According to an embodiment, in response to a change in cognitive agent data, cognitive agent system manager 400 updates the registration information in the appropriate vendor system using messages that conform to the API of the vendor system. For example, in response to a change to the cognitive agent ID for a particular cognitive agent, cognitive agent system manager 400 generates and transmits one or more messages to update the cognitive agent ID for a particular cognitive agent.

D. Skills Builder

FIG. 5D depicts a skills builder user interface screen 530 for creating new skills. Skills builder user interface screen 530 may be displayed in response to a user selecting the "Skills Builder" control from controls 502 on main menu user interface screen 500. In the example depicted in FIG. 5D, skills builder user interface screen 530 displays a list of skills 532 that are currently defined in cognitive agent system 150, along with controls 534 that allow a user to create a new skill, edit the data for a current skill, or delete a current skill.

In FIG. 5D the currently-selected skill is "Lock Front Door." A skill data window 536 displays the data for the currently-selected skill. Each of the data fields in skill data window 536 may be directly edited by selecting a field and changing the data contained in the selected field. The "Skill Name," "Skill ID," "Skill Type," and "Command" fields may be text entry fields that accept alphanumeric string. The "Function" field may allow text entry, and may also include user interface controls, such as a pulldown menu, that allow a user to select from a list of defined functions. The defined functions may be the names of functions for which there is corresponding code that implements the functions. Multiple functions may be selected and an execution sequence defined by ordering the functions using user interface controls, or by specifying an order of performance of the functions. Skills builder user interface screen 530 may indicate the type of input and output for each of a plurality of available functions to aid the user in building multi-function skills. In addition, skills builder user interface screen 530 may provide a visual indication of whether two functions are compatible in a proposed order, i.e., whether the output from one function is compatible with the input of another function, e.g., by displaying one or more user interface objects or changing the color of user interface objects that correspond to functions to indicate that the proposed order is compatible. Skills builder user interface screen 530 may also allow a user to specify logic for defined functions using logic symbols and operators.

Controls 538 allow a user to save or discard changes. In response to a request to save changes, skills definitions data 466 is updated accordingly. A control 501 allows a user to return to main menu user interface screen 500.

Creating a new skill in cognitive agent system 150 is accomplished by a user selecting the "New" control from controls 534, entering data into skill data window 536, followed by selecting the "Save" control from controls 538. When a request is received to create a new skill by selection of the "Save" control from controls 538 then the skill is saved on cognitive agent system 150 and is ready to be deployed to vendor systems during the deployment phase described hereinafter.

FIG. 6C is a flow diagram 640 that depicts an approach for defining a new skill in cognitive agent system 150. In step 642, a user accesses skills builder user interface screen 530 by selecting the "Skills Builder" option from controls 502 on main menu user interface screen 500. In step 644, the user requests to create a new skill by selecting the "New" control from controls 534. In step 646, the user provides information for the new skill by entering the information in skill data window 536 and selecting the "Save" control from controls 538.

In step 648, the new skill is defined in cognitive agent system 150. This may include updating skills definitions data 466 to include the data entered by the user into skills builder user interface screen 530.

According to one embodiment, skills builder user interface screen 530 includes functionality that allows a user to group multiple individual skills into a skill group. The skill group may then be deployed to vendor systems in the same manner as individual skills, as described in more detail hereinafter. This may be beneficial for vendor systems, such as Amazon's Alexa platform, that support skills with multiple commands. For example, controls 534 (FIG. 5D) may include a "Group" control that allows a user to create and name a skill group, and then select skills to be included in the skill group. One example of a skill group is a "Home Control" skill group that includes the "Lights On," "Lights Off," and "Lock Front Door" skills of FIG. 5D. At deployment, described hereinafter with reference to FIG. 5F, the "Home Control" skill group may be included in the list of items 552 to be deployed and selected by a user for deployment in the same manner as users, cognitive agents, and individual skills.

E. Conversations Builder

Figure 5E:
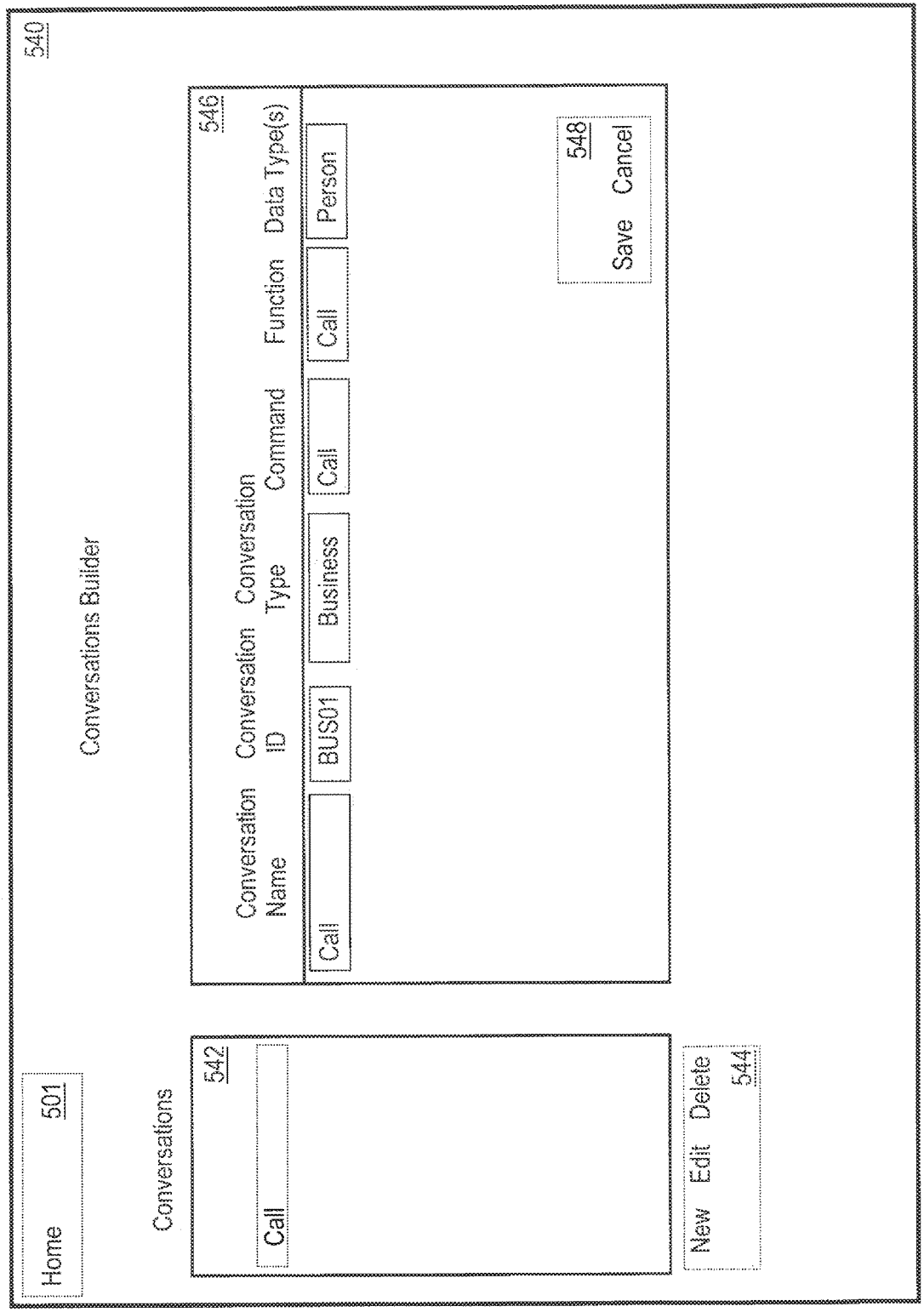
FIG. 5E depicts a conversations builder user interface screen for creating new conversations.

FIG. 5E depicts a conversations builder user interface screen 540 for creating new conversations. Conversations builder user interface screen 540 may be displayed in response to a user selecting the "Conversations Builder" control from controls 502 on main menu user interface screen 500. In the example depicted in FIG. 5D, conversations builder user interface screen 540 displays a list of conversations 542 that are currently defined in cognitive agent system 150, along with controls 544 that allow a user to create a new conversation, edit the data for a currently-defined conversation, or delete a currently-defined conversation.

In FIG. 5E the currently-selected conversation is "Call." A conversation data window 546 displays the data for the currently-selected conversation. Each of the data fields in conversation data window 546 may be directly edited by selecting a field and changing the data contained in the selected field. Controls 548 allow a user to save or discard changes. In response to a request to save changes, conversation definitions data 468 is updated accordingly. A control 501 allows a user to return to main menu user interface screen 500.

Creating a new conversation in cognitive agent system 150 is accomplished by a user selecting the "New" control from controls 534, entering data into conversation data window 546, followed by selecting the "Save" control from controls 548. When a request is received to create a new skill by selection of the "Save" control from controls 548 then the skill is saved on cognitive agent system 150 and is ready to be deployed to vendor systems during the deployment phase described hereinafter.

FIG. 6D is a flow diagram 640 that depicts an approach for defining a new conversation in cognitive agent system 150. In step 642, a user accesses conversation builder user interface screen 540 by selecting the "Conversations Builder" option from controls 502 on main menu user interface screen 500. In step 644, the user requests to create a new conversation by selecting the "New" control from controls 544. In step 646, the user provides information for the new conversation by entering the information in conversation data window 538 and selecting the "Save" control from controls 548.

In step 648, the new conversation is defined in cognitive agent system 150. This may include updating conversation definitions data 468 to include the data entered by the user into conversations builder user interface screen 540.

IV. THE COGNITIVE AGENT DEPLOYMENT AND EXECUTION ENVIRONMENT

Figure 5F:
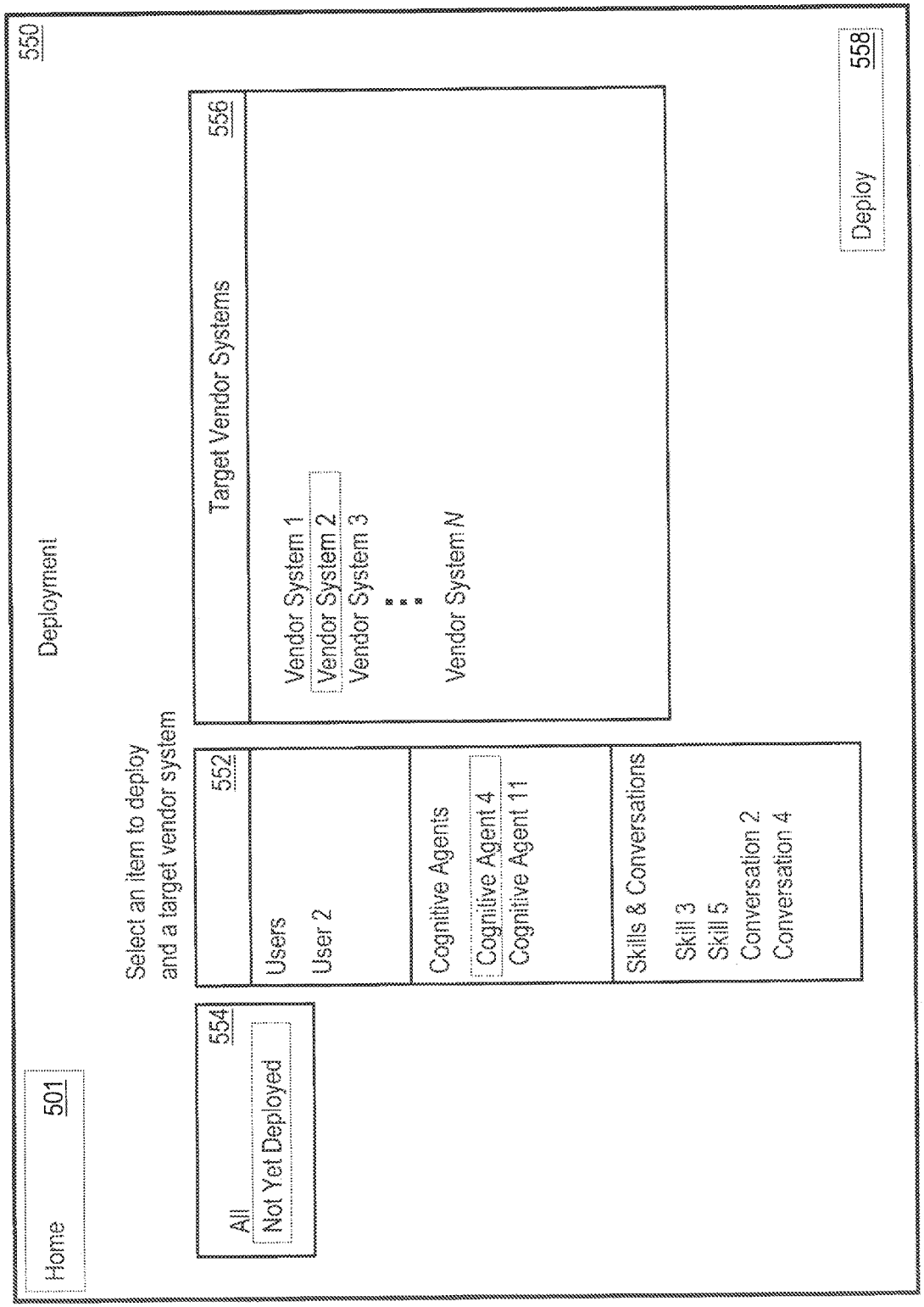
FIG. 5F depicts a deployment user interface screen for deploying users, cognitive agents, skills, and conversations defined in cognitive agent system to vendor systems.

Cognitive agent system 150 includes the capability to deploy users, cognitive agents, skills, and conversations to vendor systems. FIG. 5F depicts a deployment user interface screen 550 for deploying users, cognitive agents, skills, and conversations defined in cognitive agent system 150 to vendor systems. Deployment user interface screen 550 may be displayed in response to a user selecting the "Deployment" control from controls 502 on main menu user interface screen 500.

In the example depicted in FIG. 5F, deployment user interface screen 550 displays a list of items 552 that are currently defined in cognitive agent system 150. Controls 554 allow a user to select the candidate items to be included in list of items 552. Selecting the "All" control from controls 554 causes all items (users, cognitive agents, skills, and conversations) defined in cognitive agent system 150 to be included in list of items 552, regardless of whether those items have actually been deployed. This may be useful in situations where a user wishes to deploy a skill to multiple vendor systems. For example, suppose that a user defines a new core skill that is useful to many users. The user deploys the new core skill to a first vendor system and starts using it with service endpoints purchased from the vendor of the first vendor system. Suppose sometime later that the user decides to deploy the new core skill to a second vendor system that is different than the first vendor system. The "All" control will show the new core skill as available for deployment, even though it is currently deployed on service endpoints that operate with the first vendor system.

Selecting the "Not Yet Deployed" control from controls 554 causes only the items that have not yet been deployed to be included in list of items 552. Continuing with the prior example, the new core skill that is already deployed on service endpoints for the first vendor system would not be included in the list of items 552. The determination of which items have not yet been deployed may be made based upon the status value in user data 462, cognitive agent data 464, skills definitions data 466, and conversations definitions data 468. A user may switch between all items and items that are not yet deployed using controls 554, and list of items 552 is dynamically updated.

A user then selects a particular item to be deployed. In the example depicted in FIG. 5F, the item "Cognitive Agent 4" has been selected for deployment. A target vendor systems area 556 displays a list of target vendor systems that are available for deployment. The target vendor systems included in target vendor systems area 556 may include all vendor systems known to cognitive agent system 150. Alternatively, the target vendor systems included in target vendor systems area 556 may include only the vendor systems that are compatible with the selected item to be deployed. For example, if the user that is selected is an organization, only the vendor systems that support organization-based users are included in target vendor systems area 556. As another example, if a cognitive agent is selected, only the vendor systems that support the selected cognitive agent are included in target vendor systems area 556. Target vendor systems area 556 includes user interface controls that allow a user to select one or more target vendor systems. For example, a user may use a pointing device, such as a mouse, trackball, etc., to select one or more target vendor systems.

Once a particular item and a target vendor system have been selected, a deploy control 558 causes the selected item to be deployed to the target vendor system. In the example depicted in FIG. 5F, the user has selected Cognitive Agent 4 to be deployed to Vendor System 2.

Deploying a selected item to a target vendor system may include several different steps, depending upon the type of item selected. For example, suppose that the selected item is a user or a cognitive agent. In this situation, source code does not need to be uploaded to the target vendor system. Cognitive agent system manager 400 uses vendor system API data 470 to generate and transmit one or more messages to the target vendor system to register the user or cognitive agent in the target vendor system. For example, the messages may command the target vendor system to register a particular user with the target vendor system. The messages include one or more portions (or all) of the user data 462 for the particular user. For example, some target vendor systems may require less than all of the available user data 462 for the user. The messages conform to the API of the vendor system and the result is that the user is registered in the target vendor system. The commands may include any commands necessary to activate the cognitive agents in the vendor system. Cognitive agent system manager 400 may receive a response from the target vendor system confirming that the registration of the particular user was successful. In response to receiving this message, cognitive agent system manager 400 updates the value of status in user data 462 for the particular user to indicate the successful registration of the particular user on the target vendor system. Alternatively, for vendor systems that have a limited API, or no API, the registration information may be updated by interacting programmatically with a Web-based user interface of the vendor system.

If the selected item is a skill or and conversation, deployment involves the additional step of providing, to the target vendor system, code that implements the skill or conversation. The code may be in any format that may vary depending upon a particular implementation. One non-limiting example implementation is JavaScript, although other scripting languages, or languages, may be used. Another non-limiting example is one or more JSON skills definition files that are compatible with the vendor system, such as Amazon's Alexa platform.

According to one embodiment, cognitive agent system manager 400 determines a code format required by the target vendor system and converts the code that implements the selected item into a format supported by the target vendor system. For example, the code on cognitive agent system 150 that implements the skill or conversation may be in a first format and the target vendor system has a requirement that hosted code for skills must conform to a second format that is different than the first format. Cognitive agent system manager 400 converts the code from the first format to the second format to make the converted code compatible with the target vendor system. As one non-limiting example, this may include converting source code into one or more JSON files for uploading to a hosting service of the target vendor system. Cognitive agent system manager 400 then uploads the converted code to the target vendor system by generating and transmitting, to the target vendor system, one or more messages that conform to the API supported by the target vendor system. The messages may include one or more commands supported by the target vendor system for uploading code that implements skills or conversations. The messages may also include one or more commands to cause cognitive agents to begin operating.

Although depicted in the figures and described herein in the context of deploying a single item to a single target vendor system, embodiments are not limited to this example. According to a "bulk deployment" approach, a user may select multiple items and multiple target vendor systems. Each of the selected multiple items is deployed to each of the selected target vendor systems using the approaches described herein.

Deployment is also applicable to cognitive agents that are not associated with a particular vendor. According to an embodiment, deployment of cognitive agents that are not associated with a particular vendor, such as the cognitive agents implemented on service endpoints 130, 140, includes binding the skills and conversations, as defined in cognitive agent data 464, to the cognitive agent in cognitive agent system 150. For example, suppose that list of items 552 includes a particular cognitive agent that is installed on service endpoint 130 and the user selects the particular cognitive agent for deployment. During deployment, the skills and conversations defined in cognitive agent data 464 for the particular cognitive agent are bound to the particular cognitive agent, i.e., activated in cognitive agent system 150, so that the particular cognitive agent implements the skills and conversations. Deployment for cognitive agents that are not associated with a particular vendor may also include performing any additional steps required to activate the cognitive agents. For example, deployment and monitoring 408 may issue one or more commands to a cognitive agent to activate the cognitive agent on an endpoint device.

Once deployed, deployment and monitoring 408 monitors the activities and performance of users, cognitive agents, skills and conversations. For example, deployment and monitoring 408 may generate usage statistics for each skills and conversation that may be used to improve the implementation of the skills and conversations, or to develop new skills and conversations.

According to one embodiment, the execution of skills and conversations is personalized to users to improve relevance and performance. To achieve these benefits, the code that implements a skill or conversation identifies a user associated with the execution of the skill or conversation. This may be determined, for example, by data that binds a cognitive agent, skill, or conversation to a particular user, or by person identification from the audio generated by the cognitive agent. Once the user has been identified, queries for information may be personalized to the user. For example, a skill or conversation that implements a call may use the contacts of the identified user to increase relevancy. As another example, a skill or conversation that includes a query for information may tailor the query to the identified user, or filter the search results to the identified user. For example, suppose that a user invokes a skill or conversation to retrieve information pertaining to a business meeting that just concluded. Knowing the identity of the user, the skill or conversation may first query a meeting service to learn the most recent business meeting attended by the user, and then use the identity of the business meeting as a search criteria that is submitted to an information retrieval service to retrieve information related to the business meeting.

V. IMPLEMENTATION EXAMPLES

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
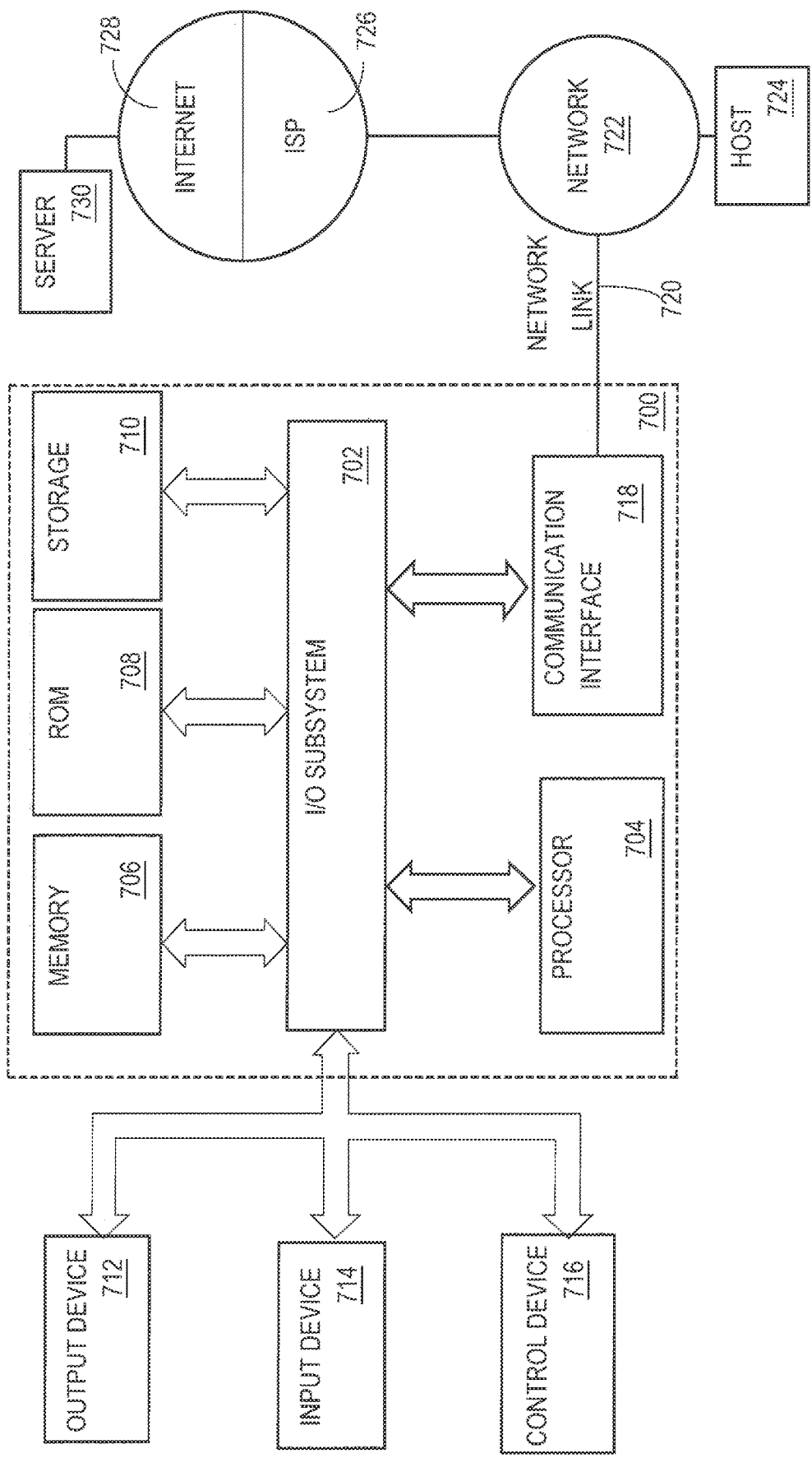
FIG. 7 is a block diagram of a computer system on which embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
   generating and providing to a client device, by a management application executing on an apparatus, via one or more computer networks, a user interface that allows a user of the client device to specify a definition of a skill to be implemented with a plurality of cognitive agents across a plurality of vendor platforms, wherein the definition of the skill specifies a condition and two or more functions to be performed in response to satisfaction of the condition, and
   performing, by the management application, a compatibility check of inputs and outputs of the two or more functions and providing, via the user interface, a visual indication of a result of the compatibility check of the inputs and outputs of the two or more functions specified by the definition of the skill.

2. The computer-implemented method as recited in claim 1, wherein the user interface further allows the user of the client device to specify one or more attribute values that include an attribute value that binds the skill to one or more of: a particular cognitive agent, from the plurality of cognitive agents, or the user.

3. The computer-implemented method as recited in claim 1, wherein the user interface further allows the user of the client device to specify one or more attribute values that include an attribute value that binds the skill to both a service endpoint and a device that is associated with a particular cognitive agent, from the plurality of cognitive agents, and the service endpoint.

4. The computer-implemented method as recited in claim 1, wherein the user interface allows a user to specify a skill group for the skill, wherein the skill group includes at least one other skill.

5. The computer-implemented method as recited in claim 1, wherein the user interface further allows a user to specify a definition of a conversation to be implemented with a plurality of cognitive agents across a plurality of vendor platforms, wherein the definition of the conversation specifies plurality of interactions, wherein each interaction includes a condition, one or more functions to be performed in response to satisfaction of the condition, and a data type.

6. The computer-implemented method as recited in claim 5, wherein the user interface further allows a user to specify, for a particular cognitive agent, definition data that specifies one or more attribute values for the particular cognitive agent, and wherein the one or more attribute values include an attribute value that binds the conversation to the particular cognitive agent.

7. An apparatus comprising:
   one or more processors,
   one or more memories communicatively coupled to the one or more processors, and
   a management application executing on the apparatus, the management application being configured to:
     generate and provide to a client device, via one or more computer networks, a user interface that allows a user of the client device to specify a definition of a skill to be implemented with a plurality of cognitive agents across a plurality of vendor platforms, wherein the definition of the skill specifies a condition and two or more functions to be performed in response to satisfaction of the condition, and perform a compatibility check of inputs and outputs of the two or more functions and provide, via the user interface, a visual indication of a result of the compatibility check of the inputs and outputs of the two or more functions specified by the definition of the skill.

8. The apparatus as recited in claim 7, wherein the user interface further allows the user of the client device to specify one or more attribute values that include an attribute value that binds the skill to one or more of: a particular cognitive agent, from the plurality of cognitive agents, or the user.

9. The apparatus as recited in claim 7, wherein the user interface further allows the user of the client device to specify one or more attribute values that include an attribute value that binds the skill to both a service endpoint and a device that is associated with a particular cognitive agent, from the plurality of cognitive agents, and the service endpoint.

10. The apparatus as recited in claim 7, wherein the user interface allows a user to specify a skill group for the skill, wherein the skill group includes at least one other skill.

11. The apparatus as recited in claim 7, wherein the user interface further allows a user to specify a definition of a conversation to be implemented with a plurality of cognitive agents across a plurality of vendor platforms, wherein the definition of the conversation specifies plurality of interactions, wherein each interaction includes a condition, one or more functions to be performed in response to satisfaction of the condition, and a data type.

12. The apparatus as recited in claim 11, wherein the user interface further allows a user to specify, for a particular cognitive agent, definition data that specifies one or more attribute values for the particular cognitive agent, and wherein the one or more attribute values include an attribute value that binds the conversation to the particular cognitive agent.

13. The apparatus as recited in claim 7, wherein implementing the skill with the plurality of cognitive agents across the plurality of vendor platforms includes generating and transmitting one or more messages to each vendor platform from the plurality of vendor platforms, wherein the one or more messages to each vendor platform conform to an application program interface supported by the vendor platform.

14. One or more non-transitory computer-readable media storing instructions which, when processed by one or more processors, cause:

a management application executing on an apparatus to:
generate and provide to a client device, via one or more computer networks, a user interface that allows a user of the client device to specify a definition of a skill to be implemented with a plurality of cognitive agents across a plurality of vendor platforms, wherein the definition of the skill specifies a condition and two or more functions to be performed in response to satisfaction of the condition, and perform a compatibility check of inputs and outputs of the two or more functions and provide, via the user interface, a visual indication of a result of the compatibility check of the inputs and outputs of the two or more functions specified by the definition of the skill.

15. The one or more non-transitory computer-readable media as recited in claim 14, wherein the user interface further allows the user of the client device to specify one or more attribute values that include an attribute value that binds the skill to one or more of: a particular cognitive agent, from the plurality of cognitive agents, or the user.

16. The one or more non-transitory computer-readable media as recited in claim 14, wherein the user interface further allows the user of the client device to specify one or more attribute values that include an attribute value that binds the skill to both a service endpoint and a device that is associated with a particular cognitive agent, from the plurality of cognitive agents, and the service endpoint.

17. The one or more non-transitory computer-readable media as recited in claim 14, wherein the user interface allows a user to specify a skill group for the skill, wherein the skill group includes at least one other skill.

18. The one or more non-transitory computer-readable media as recited in claim 14, wherein the user interface further allows a user to specify a definition of a conversation to be implemented with a plurality of cognitive agents across a plurality of vendor platforms, wherein the definition of the conversation specifies plurality of interactions, wherein each interaction includes a condition, one or more functions to be performed in response to satisfaction of the condition, and a data type.

19. The one or more non-transitory computer-readable media as recited in claim 18, wherein the user interface further allows a user to specify, for a particular cognitive agent, definition data that specifies one or more attribute values for the particular cognitive agent, and wherein the one or more attribute values include an attribute value that binds the conversation to the particular cognitive agent.

20. The one or more non-transitory computer-readable media as recited in claim 14, wherein implementing the skill with the plurality of cognitive agents across the plurality of vendor platforms includes generating and transmitting one or more messages to each vendor platform from the plurality of vendor platforms, wherein the one or more messages to each vendor platform conform to an application program interface supported by the vendor platform.

* * * * *